(12) United States Patent
Machida et al.

(10) Patent No.: US 8,049,797 B2
(45) Date of Patent: Nov. 1, 2011

(54) IMAGE SENSOR AND COLOR IMAGING APPARATUS

(75) Inventors: Yoshihito Machida, Yokohama (JP); Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 697 days.

(21) Appl. No.: 12/112,158

(22) Filed: Apr. 30, 2008

(65) Prior Publication Data

US 2008/0278596 A1 Nov. 13, 2008

(30) Foreign Application Priority Data

May 8, 2007 (JP) .................. 2007-123374
Mar. 31, 2008 (JP) .................. 2008-091560

(51) Int. Cl.
*H04N 3/14* (2006.01)
(52) U.S. Cl. ................. 348/272; 348/273
(58) Field of Classification Search .......... None
See application file for complete search history.

(56) References Cited

U.S. PATENT DOCUMENTS

| 7,123,299 B1 | 10/2006 | Yoshida et al. | |
|---|---|---|---|
| 2007/0019086 A1 | 1/2007 | Yoshida et al. | |
| 2007/0216785 A1* | 9/2007 | Nomura et al. | 348/242 |
| 2007/0296841 A1* | 12/2007 | Nomura | 348/273 |

FOREIGN PATENT DOCUMENTS

JP 2000-299871 A 10/2000

* cited by examiner

*Primary Examiner* — David Ometz
*Assistant Examiner* — Angel L Garces-Rivera
(74) *Attorney, Agent, or Firm* — Canon U.S.A., Inc. IP Division

(57) ABSTRACT

An image sensor includes a photoelectric conversion element group, and color filters of at least two colors arranged on respective photoelectric conversion elements of the photoelectric conversion element group. The color filters are arranged on the respective photoelectric conversion elements such that a spatial frequency component of array of color filters of each color includes a reduced amount of component in a low-frequency region and a band component in a high-frequency region.

8 Claims, 34 Drawing Sheets

| | BAYER | RANDOM | EMBODIMENT |
|---|---|---|---|
| ARRAY | 501 | 502 | 503 |
| FREQUENCY CHARACTERISTICS | 504 RESPONSE / FREQUENCY | 505 RESPONSE / FREQUENCY | 506 RESPONSE / FREQUENCY |
| FEATURES | NOISE: SMALL MOIRE: LARGE | NOISE: LARGE MOIRE: SMALL | NOISE: SMALL MOIRE: SMALL |

FIG.4
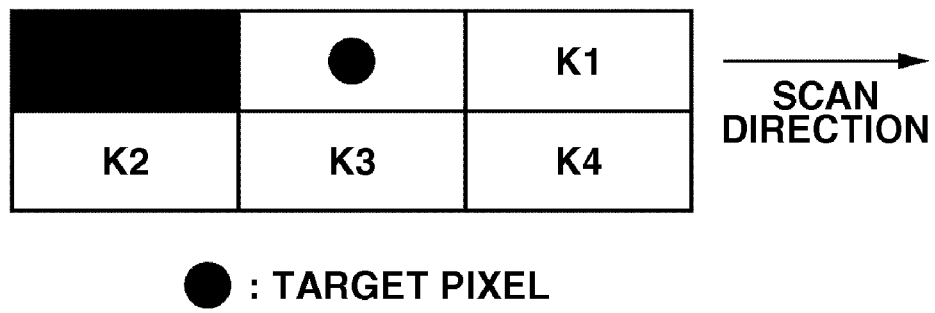
● : TARGET PIXEL
FIG.5
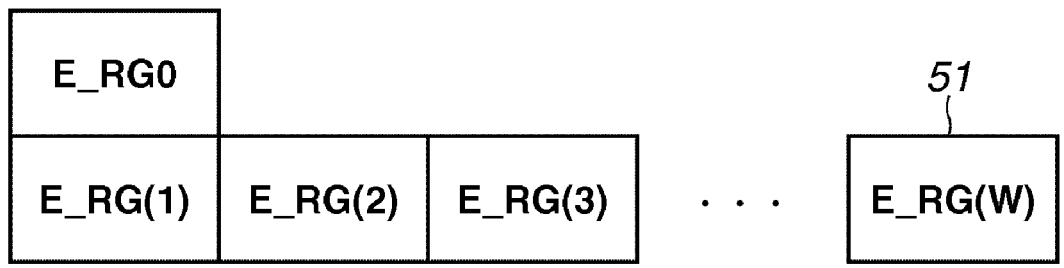
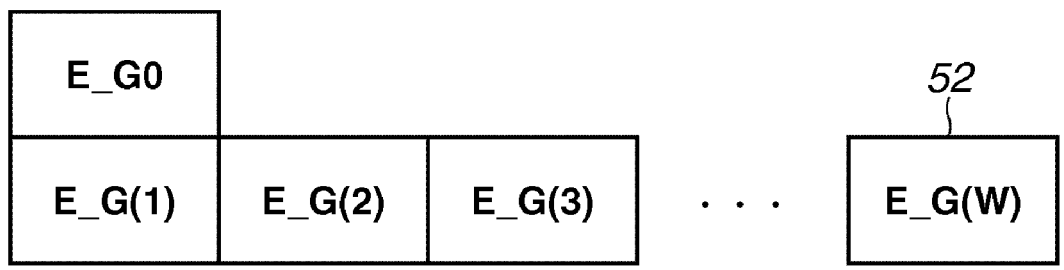

FIG.13
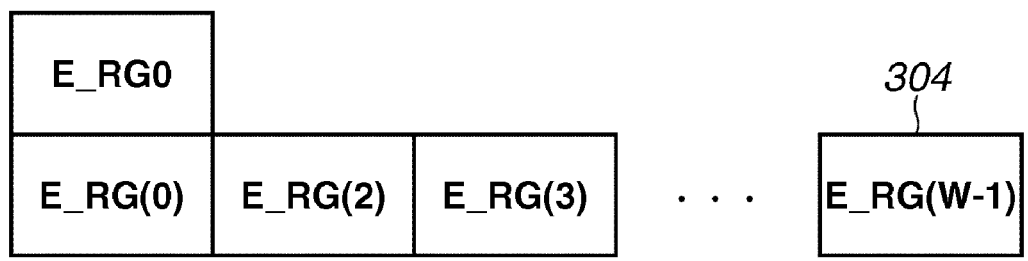
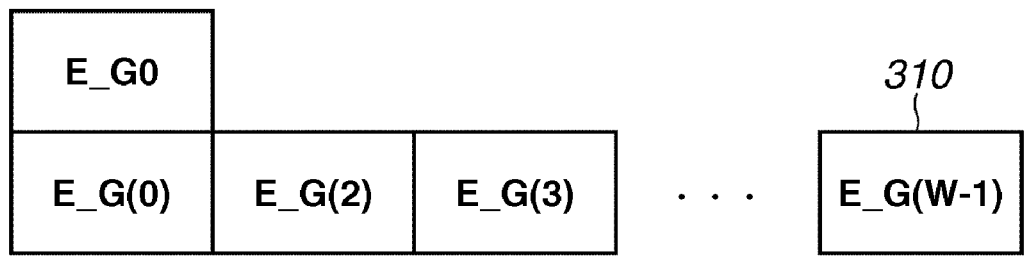

FIG.14

| ARRAY | BAYER | RANDOM | EMBODIMENT |
|---|---|---|---|
| FREQUENCY CHARACTERISTICS | 501, RESPONSE/FREQUENCY (504) | 502, RESPONSE/FREQUENCY (505) | 503, RESPONSE/FREQUENCY (506) |
| FEATURES | NOISE: SMALL<br>MOIRE: LARGE | NOISE: LARGE<br>MOIRE: SMALL | NOISE: SMALL<br>MOIRE: SMALL |

FIG.19

| 0.01 | 0.03 | 0.04 | 0.12 | 0.01 |
|---|---|---|---|---|
| 0.03 | 0.05 | 0.07 | 0.05 | 0.03 |
| 0.04 | 0.07 | 0.08 | 0.07 | 0.04 |
| 0.03 | 0.05 | 0.07 | 0.05 | 0.03 |
| 0.01 | 0.03 | 0.04 | 0.03 | 0.01 |

801 points to this matrix.

F_R

| 0.00 | 0.00 | 0.01 | 0.01 | 0.01 | 0.01 | 0.01 | 0.00 | 0.00 |
|---|---|---|---|---|---|---|---|---|
| 0.00 | 0.01 | 0.01 | 0.01 | 0.01 | 0.01 | 0.01 | 0.01 | 0.00 |
| 0.01 | 0.01 | 0.02 | 0.02 | 0.02 | 0.02 | 0.02 | 0.01 | 0.01 |
| 0.01 | 0.01 | 0.02 | 0.02 | 0.03 | 0.02 | 0.02 | 0.01 | 0.01 |
| 0.01 | 0.01 | 0.02 | 0.03 | 0.04 | 0.03 | 0.02 | 0.01 | 0.01 |
| 0.01 | 0.01 | 0.02 | 0.02 | 0.03 | 0.02 | 0.02 | 0.01 | 0.01 |
| 0.01 | 0.01 | 0.02 | 0.02 | 0.02 | 0.02 | 0.02 | 0.01 | 0.01 |
| 0.00 | 0.01 | 0.01 | 0.01 | 0.01 | 0.01 | 0.01 | 0.01 | 0.00 |
| 0.00 | 0.00 | 0.01 | 0.01 | 0.01 | 0.01 | 0.01 | 0.00 | 0.00 |

803 points to this matrix.

F_B

| 0.01 | 0.02 | 0.03 | 0.02 | 0.01 |
|---|---|---|---|---|
| 0.02 | 0.06 | 0.08 | 0.06 | 0.02 |
| 0.03 | 0.08 | 0.10 | 0.08 | 0.03 |
| 0.02 | 0.06 | 0.08 | 0.06 | 0.02 |
| 0.01 | 0.03 | 0.04 | 0.03 | 0.01 |

802 points to this matrix.

F_G

FIG.23
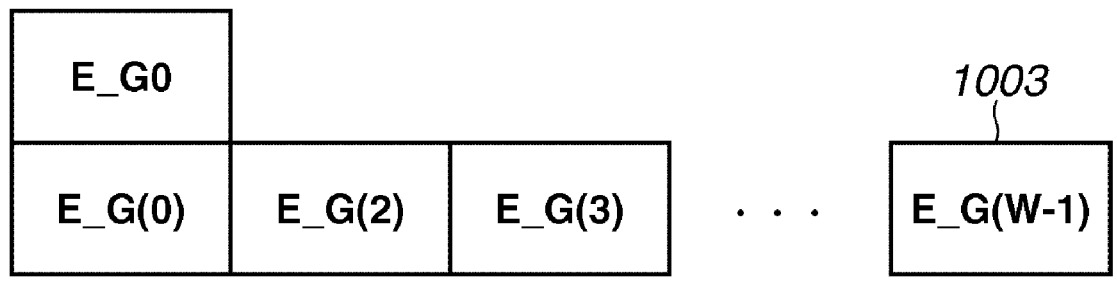
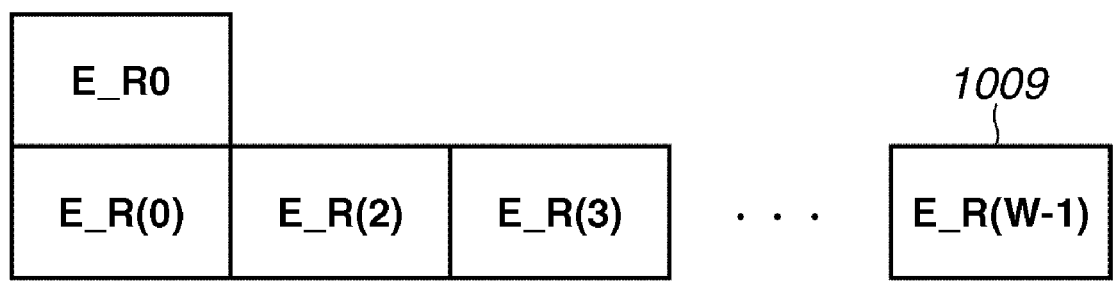

FIG.26
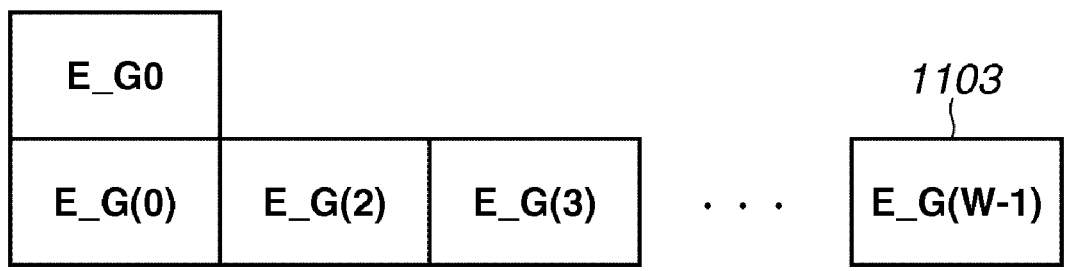
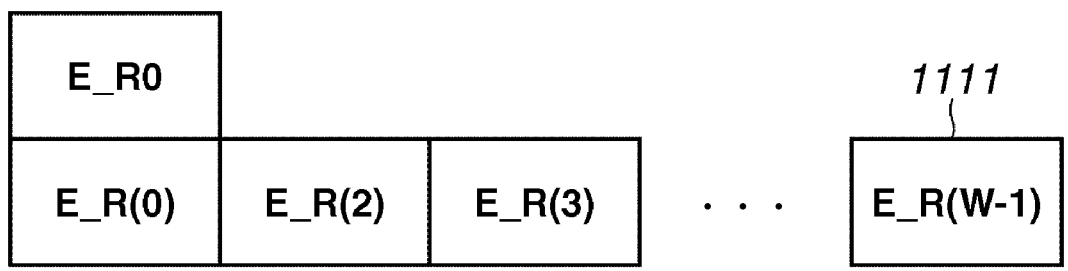

FIG.38
VERTICAL CROSSING-OVER
PARENT 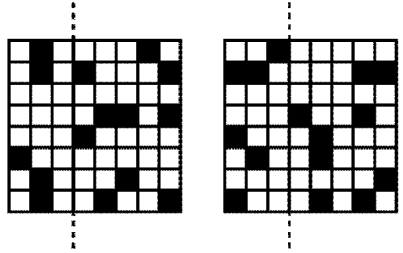 CHILD 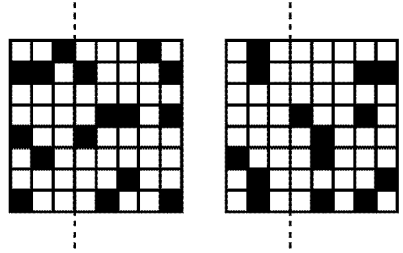
HORIZONTAL CROSSING-OVER
PARENT 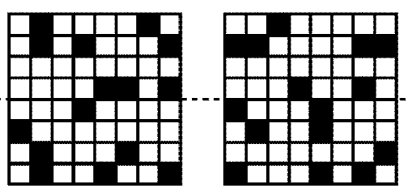 CHILD 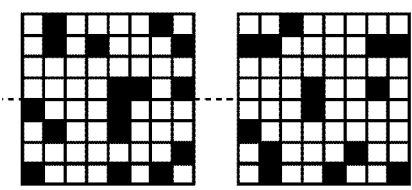
FIG.39
MUTATION
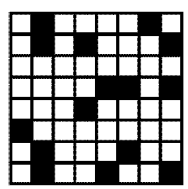  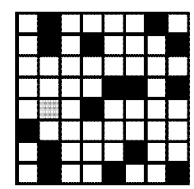

IMAGE SENSOR AND COLOR IMAGING APPARATUS

BACKGROUND OF THE INVENTION

1. Field of the Invention

The present invention relates to an image sensor that includes a photoelectric conversion element group on which color filters are arranged in a predetermined pattern. An image sensor according to the present invention can be applied to a charge-coupled device (CCD). Furthermore, the present invention relates to a color imaging apparatus including an image sensor.

2. Description of the Related Art

Image pickup tubes and solid-state image sensors are widely used for various imaging apparatuses. A color image sensor incorporated in a single tube or a single plate (collectively referred to as "single sensor") type color imaging apparatus can be configured to constitute a color imaging unit by itself. Therefore, the single color image sensor does not require any color separation prism and does not require any positioning adjustment unlike a multiple-plate image sensor. The single color image sensor can downsize a color imaging apparatus and reduce electric power consumption. The single sensor type color camera incorporating a color CCD image sensor (solid-state image sensor) is widely used.

The above-described color image sensor includes color filters (which are generally referred to as "stripe filters" or "mosaic filters") disposed on a predetermined light-receiving plane and is configured to perform color modulation (color filter processing) to obtain color information from a single light-receiving element.

For example, if a color image sensor is configured to include RGB 3-color filters in a predetermined regular pattern disposed on photoelectric conversion elements (pixels), each pixel can have unique spectral sensitivity. When an image of an object is captured by a color image sensor, the image signal includes dot sequential color information reflecting the above-described color filter array. Therefore, if the image signal is separable into signals corresponding to respective color filters according to the above-described predetermined array, color information can be obtained based on the separated signals.

A luminance signal (Y signal) is obtainable from RGB information. In other words, a luminance signal of one pixel can be obtained if information of at least three pixels (each of RGB pixels) is obtained. This type of color image sensor can capture a color image by itself although luminance resolution may slightly deteriorate.

There are various types of conventional color filters including three primary color filters (e.g., RGB stripe and Bayer-type RGB mosaic) as well as complementary color filters (e.g., YeMgCy stripe, YeMgCyW 4-color mosaic, and YeMgCyG 4-color mosaic).

However, a conventional color filter layout using a regular array (e.g., Bayer array) tends to generate spurious resolution (color moire) based on spatial sampling according to the array. Therefore, a conventional single sensor-type color imaging apparatus requires an optical low-pass filter capable of assuring image quality. However, the provision of such a filter deteriorates image resolution. Therefore, the conventional color filter layout (represented by the Bayer array) may not simultaneously satisfy two requirements, i.e., prevention of color moire and improvement of resolution.

As discussed in Japanese Patent Application Laid-Open No. 2000-299871, there is a conventional method for randomly arraying color filters to suppress generation of color moire or reduction in image resolution. However, according to the method discussed in Japanese Patent Application Laid-Open No. 2000-299871, an image may include noise components due to non-uniform spatial frequency (deviation in frequency).

SUMMARY OF THE INVENTION

Exemplary embodiments of the present invention are directed to a color imaging apparatus capable of reducing generation of color moire and removing noise components from a captured image.

According to an aspect of the present invention, an image sensor includes a photoelectric conversion element group having a plurality of photoelectric conversion elements, and color filters of at least two colors arranged on respective photoelectric conversion elements of the photoelectric conversion element group. The color filters are arranged on the respective photoelectric conversion elements such that a spatial frequency component of array of color filters of each color includes a reduced amount of component in a low-frequency region and a band component in a high-frequency region.

According to another aspect of the present invention, a color imaging apparatus includes a color image sensor that includes a photoelectric conversion element group and color filters of at least two colors arranged on the photoelectric conversion element group, and an interpolation processing unit configured to perform interpolation processing on color signals output from the color image sensor to generate image signals corresponding to a plurality of color components. The color filters are arranged on the photoelectric conversion element group such that a spatial frequency component of array of color filters of each color includes a reduced amount of component in a low-frequency region and a band component in a high-frequency region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 4 illustrates example error diffusion coefficients.

FIG. 5 illustrates an example cumulative error line buffer.

FIG. 13 illustrates an example configuration of the cumulative error line buffer.

FIG. 14 illustrates three types of color filter arrays.

FIG. 19 illustrates example image interpolation digital filters F_R, F_G, and F_B.

FIG. 23 illustrates another example configuration of the cumulative error line buffer.

FIG. 26 illustrates another example configuration of the cumulative error line buffer.

FIG. 38 illustrates example crossing-over.

FIG. 39 illustrates an example mutation.

DETAILED DESCRIPTION OF THE EMBODIMENTS

Figure 1:
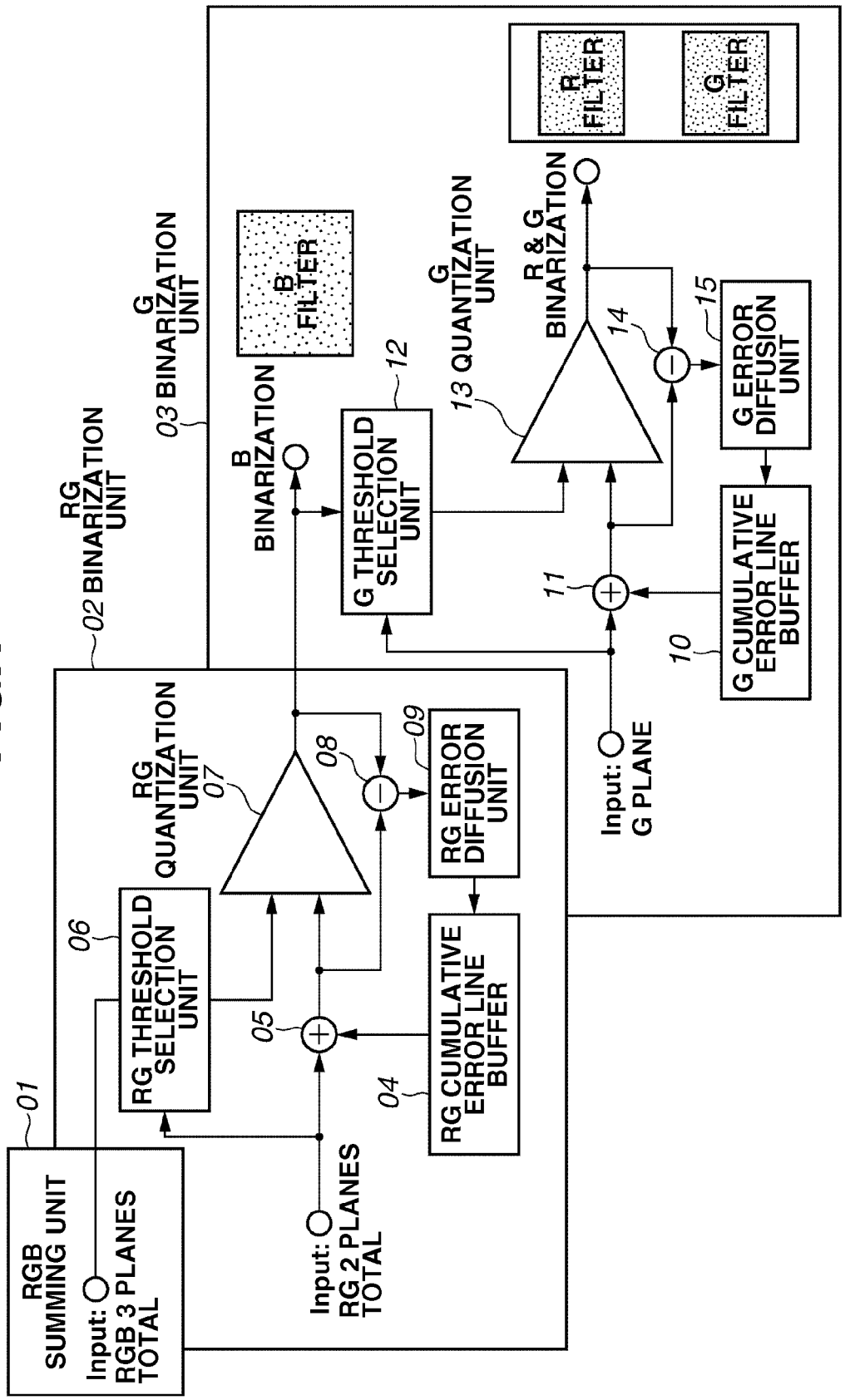
FIG. 1 is a block diagram illustrating an example data processing system configuration of an information processing apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 is a block diagram illustrating an example data processing system configuration of an information processing apparatus according to a first exemplary embodiment.

The information processing apparatus illustrated in FIG. 1 includes an RGB summing unit 01, an RG binarization unit 02, and a G binarization unit 03. The RG binarization unit 02 includes an RG cumulative error line buffer 04, an RG cumulative error adding unit 05, an RG threshold selection unit 06, an RG quantization unit 07, an RG error calculation unit 08, and an RG error diffusion unit 09. The G binarization unit 03 includes a G cumulative error line buffer 10, a G cumulative error adding unit 11, a G threshold selection unit 12, a G quantization unit 13, a G error calculation unit 14, and a G error diffusion unit 15.

The RGB summing unit 01 receives total pixel data (RGB total data) of the RGB planes. The RG cumulative error line buffer 04 stores quantization errors. The RG cumulative error adding unit 05 adds, to the RG total data, an error corresponding to a horizontal pixel position of the RG total data. The RG threshold selection unit 06 selects a threshold. The RG quantization unit 07 determines output pixel data and a final result of the B filter. The RG error calculation unit 08 calculates a difference between the error-added pixel data of a target pixel and the output pixel data. The RG error diffusion unit 09 performs error diffusion processing according to a horizontal pixel position.

The G cumulative error line buffer 10 stores quantization errors. The G cumulative error adding unit 11 adds, to input pixel data, an error corresponding to a horizontal pixel position of the input pixel data. The G threshold selection unit 12 selects a threshold. The G quantization unit 13 determines a final binarization result of the R filter and a final binarization result of the G filter. The G error calculation unit 14 calculates a difference between the error-added pixel data of a target pixel and the output pixel data. The RG error diffusion unit 15 performs error diffusion processing according to the horizontal pixel position.

Furthermore, the information processing apparatus includes a control unit (not illustrated). The control unit executes processing illustrated in later-described flowcharts according to computer-executable software program(s). The information processing apparatus performs color filter layout determination processing and halftone processing applied to an image sensor. The image sensor is a color CCD image sensor that includes a photoelectric conversion element group and color filters of at least two colors (RGB 3-color filters according to an exemplary embodiment) arranged on respective photoelectric conversion elements (pixels) in a predetermined layout pattern.

The color CCD image sensor includes CCD color filters (R filters, G filters, and B filters). The color filter layout processing according to an exemplary embodiment includes determining the layout of R, G, and B filters according to each area rate relative to the entire area (color filter layout object area) of the CCD color filters of the color CCD image sensor. In the color filter layout processing according to an exemplary embodiment, a frequency component of array of color filters of each color includes a reduced amount of component in a low-frequency region and an increased amount of component in a high-frequency region.

An exemplary embodiment determines the color filter layout of a color CCD image sensor according to an error diffusion method. A later-described second exemplary embodiment determines the color filter layout of a color CCD image sensor according to a binarization method.

Figure 2:
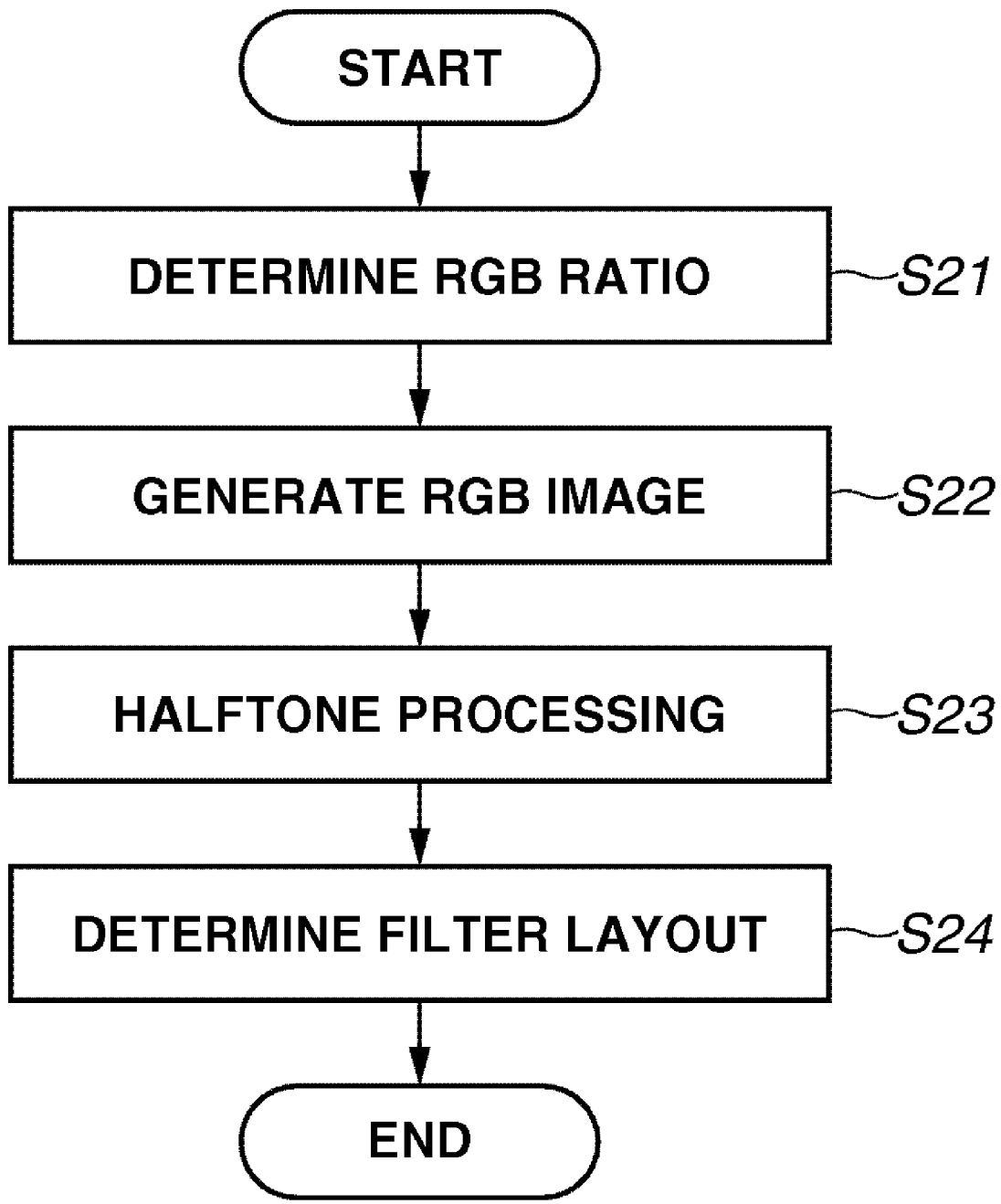
FIG. 2 is a flowchart illustrating example color filter layout determination processing performed by the information processing apparatus according to an exemplary embodiment.

Exemplary embodiments perform various operations, which are described below with reference to FIGS. 1 through 5. FIG. 2 is a flowchart illustrating example color filter layout determination processing performed by the information processing apparatus according to an exemplary embodiment.

In step S21, the control unit of the information processing apparatus determines area rates of the R filter, the G filter, and the B filter. The area rate represents the size of each area relative to the entire area (color filter layout object area) of the CCD color filters of the color CCD image sensor. According to an exemplary embodiment, the area rates of the R filter, the G filter, and the B filter (RGB ratio) are set to 3:6:1 considering the ratio of human cones.

In step S22, based on the determined RGB ratio, the control unit generates 8-bit image data for the RGB planes of the color CCD image sensor so that each of the RGB planes has uniform pixel data and the sum of pixel data on the RGB planes is equal to 255. According to this embodiment, the control unit generates pixel data on the RGB planes according to the determined RGB ratio of 3:6:1.

The following formula (1) defines pixel data I_R on the R plane.

$$I\_R = 2^{(bit\ number)} \times (\text{rate of } R)/(\text{rate of } R + \text{rate of } G + \text{rate of } B) \quad (1)$$

$$= 2^8 \times 3/(3+6+1) \approx 76$$

The following formula (2) defines pixel data I_G on the G plane.

$$I\_G = 2^{(bit\ number)} \times (\text{rate of } G)/(\text{rate of } R + \text{rate of } G + \text{rate of } B) \quad (2)$$

$$= 2^8 \times 6/(3+6+1) = 153$$

The following formula (3) defines pixel data I_B on the B plane.

$$I\_B = 2^{(bit\ number)} - (\text{pixel data of } R \text{ plane} + \text{pixel data of } G \text{ plane}) \quad (3)$$

$$= 2^8 - (76+153) = 26$$

The 8-bit image data has a horizontal width and a vertical width identical to the horizontal number and the vertical number (horizontal size and vertical size) of the CCD color filters.

In step S23, the control unit performs halftone processing (processing for smoothing the expression of gradations) on each of the above-described RGB planes. In this embodiment, the control unit converts halftone processed gradation values into two-level values (binary data).

The error diffusion method by R. Floyd et al. entitled "An adaptive algorithm for spatial gray scale", SID International Symposium Digest of Technical Papers, vol 4.3, 1975, pp. 36-37, is an example method for converting multi-valued input image data (to be subjected to the halftone processing) into binary (or any other lesser valued) image data. The halftone processing is described later in more detail.

In step S24, the control unit refers to the above-described binary image data (0, 255) having been subjected to the halftone processing and arranges the R filter, the G filter, and the B filter to the pixels having a binary value equal to 255 on respective RGB planes. Through the above-described processing, the control unit can complete the layout of the CCD color filters.

The above-described halftone processing uses the following error diffusion method. According to an exemplary embodiment, image data on the RGB planes having been subjected to the color separation processing is 8-bit image data of 0 to 255.

Figure 3:
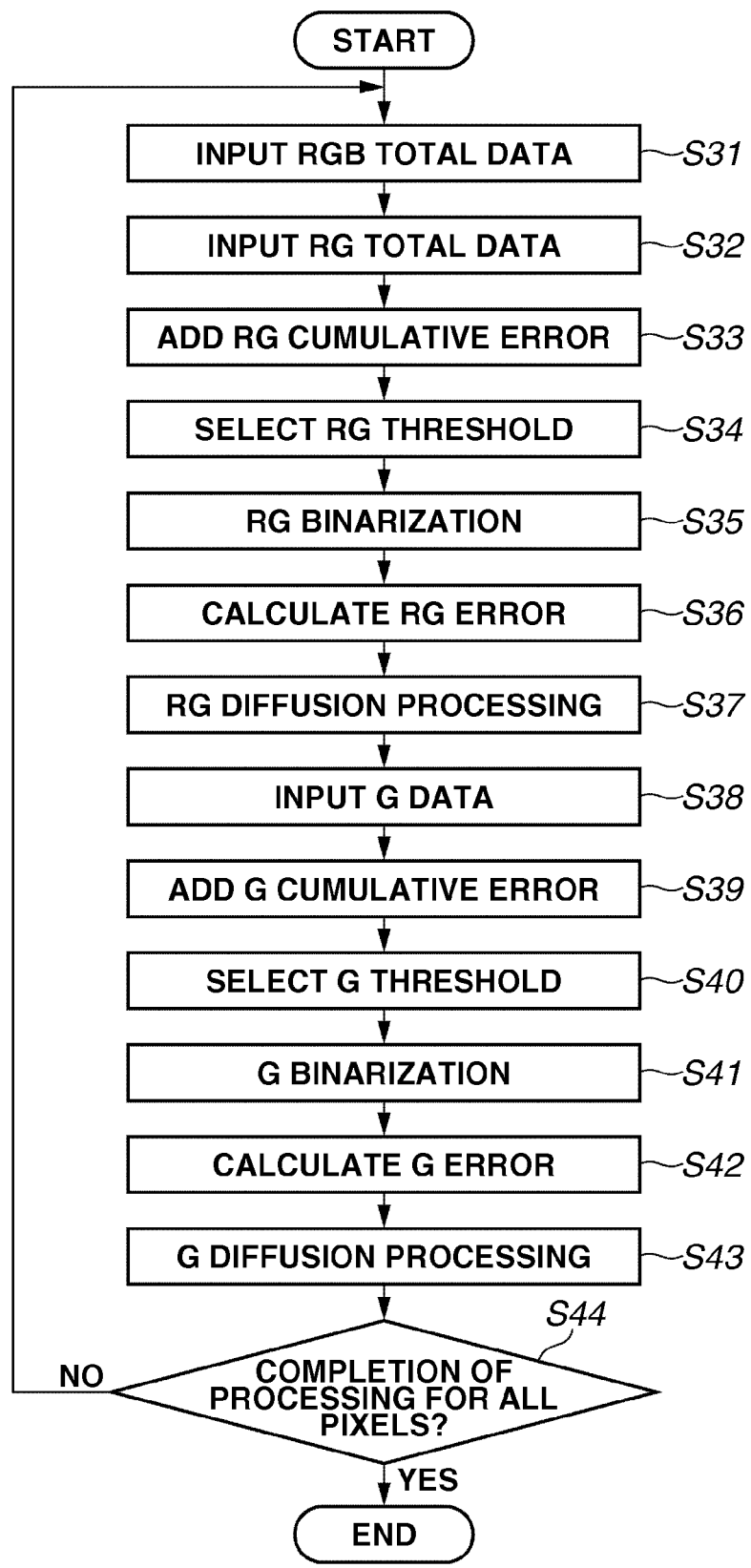
FIG. 3 is a flowchart illustrating example halftone processing performed by the information processing apparatus according to an exemplary embodiment.

FIG. 3 is a flowchart illustrating example halftone processing performed by the information processing apparatus according to an exemplary embodiment.

The processing illustrated in FIG. 3 is applied to one pixel of an image on respective RGB planes. The control unit of the information processing apparatus performs binarization processing (for obtaining quantized value 0 or 255) on pixel data of respective RGB planes in the following manner.

In step S31, the control unit obtains total pixel data I_RGB of the RGB planes. Next, the control unit inputs the total pixel data I_RGB of the RGB planes into the RGB summing unit 01. The following formula (4) expresses the total pixel data I_RGB.

$$I\_RGB = I\_R + I\_G + I\_B \quad (4)$$

Next, the control unit (the RG binarization unit 02) performs error diffusion processing on total pixel data I_RG of the R and G planes for binarization (quantized value 0 or 255). First, in step S32, the control unit inputs the pixel data I_RG of the R and G planes into the RG binarization unit 02. The following formula (5) expresses the pixel data I_RG.

$$I\_RG = I\_R + I\_G \quad (5)$$

If an exemplary embodiment uses four error diffusion coefficients (K1 through K4) illustrated in FIG. 4, the RG cumulative error line buffer 04 of the RG binarization unit 02 stores the following quantization errors. Namely, the RG cumulative error line buffer 04 includes a storage area E_RG0 and a plurality of storage areas E_RG(x) (x=1 to W) equal in total number to the number W of horizontal pixels of the input image. The RG cumulative error line buffer 04 stores quantization errors according to a method described later. The RG cumulative error line buffer 04 can initialize all data into initial values 0 or any random values before starting the processing. FIG. 5 illustrates detailed storage areas 51 of the RG cumulative error line buffer 04.

In step S33, the control unit (the RG cumulative error adding unit 05) adds, to the total pixel data on the R and G planes, the error E_RG(x) corresponding to the horizontal pixel position x of the pixel data. The following formula (6) defines I_RG' representing cumulative error-added pixel data, which can be calculated based on the input target pixel data I_RG.

$$I\_RG' = I\_RG + E\_RG(x) \quad (6)$$

In step S34, the control unit (the RG threshold selection unit 06) selects a threshold T_RG. In this case, an exemplary embodiment satisfies the following relationship.

$$t\_RG = I\_RGB - I\_RG \quad (7)$$

The following formula (8) expresses the threshold T_RG.

$$T\_RG(t\_RG) = 128 \quad (8)$$

$(0 \leq t\_RG \leq 255)$

Otherwise, to eliminate any delay in filter generation, the threshold T_RG can be finely changed according to t_RG so as to decrease an averaged quantization error. According to this embodiment, I_RGB−I_RG is equal to or less than 255. Therefore, the control unit sets T_RG(t_RG)=128.

In step S35, the control unit (the RG quantization unit 07) compares the error-added pixel data I_RG' with the threshold T_RG and determines output pixel data Out_RG and a final result Out_B of the B filter according to the following rules.

$$\text{Out\_RG}=0 \quad (9)$$

$$\text{Out\_B}=255 \quad (10)$$

(I_RG'<T_RG)

$$\text{Out\_RG}=255 \quad (11)$$

$$\text{Out\_B}=0 \quad (12)$$

(I_RG'≧T_RG)

The Control Unit Determines Binarization (Quantized value 0 or 255) of total pixel data on the R and G planes according to the above-described formulas (9) through (11). At the same time, the control unit determines a binarization result (quantized value 0 or 255) of Out_B. Namely, at this moment, the final result Out_B of the B filter is fixed. The meaning of formula (10) is that the B filter is arranged. The meaning of formula (11) is that the B filter is not arranged.

The purpose of binarization applied to the total pixel data on the R and G planes is described below. If the relationship Out_RG=255 is satisfied, either the R filter or the G filter is arranged on this position (photoelectric conversion element). Namely, the relationship Out_RG=255 indicates that the filter layout at this position is not yet fixed. However, the determination finalized at this moment is that at least one of the R filter and the G filter is arranged on this position.

The foregoing description can be summarized in the following manner.

Out_RG=0 indicates that neither of the R and G filters is arranged. Namely, it is determined that the B filter is arranged.

Out_RG=255 indicates that either the R filter or the G filter is arranged.

In step S36, the control unit (the RG error calculation unit 08) calculates a difference Err_RG between the error-added pixel data I_RG' (=target pixel data I_RG+E_RG(x)) and the output pixel data Out_RG according to the following formula (13).

$$\text{Err\_RG}(x)=\text{I\_RG'}-\text{Out\_RG} \quad (13)$$

In step S37, the control unit (the RG error diffusion unit 09) performs the following diffusion processing on the error Err_RG(x) according to the horizontal pixel position x.

$$E\_RG(x+1) \leftarrow E\_RG(x+1) + \text{Err\_RG}(x) \times 7/16 \, (x<W)$$

$$E\_RG(x-1) \leftarrow E\_RG(x-1) + \text{Err\_RG}(x) \times 3/16 \, (x>1)$$

$$E\_RG(x) \leftarrow E0\_RG + \text{Err\_RG}(x) \times 5/16 \, (1<x<W)$$

$$E\_RG(x) \leftarrow E0\_RG + \text{Err\_RG}(x) \times 8/16 \, (x=1)$$

$$E\_RG(x) \leftarrow E0\_RG + \text{Err\_RG}(x) \times 13/16 \, (x=W)$$

$$E0\_RG \leftarrow E\_RG \times 1/16 \, (x<W)$$

$$E0\_RG \leftarrow 0 \, (x=W)$$

Through the above-described processing, the control unit can complete the binarization (quantized value 0 or 255) for the total pixel data I_R' and I_G' of two planes of the R filter and the G filter which correspond to one pixel. At the same time, the binarization (quantized value 0 or 255) for pixel data I_B' of the B filter is fixed.

The purpose of binarizing total pixel data on the R and G planes is to ensure an appropriate filter layout for the R and G planes as a whole although the filter layout of respective planes is not fixed. As a result of determining an appropriate layout of the R and G filters, the binarization for pixel data I_B' of the B filter is fixed.

Namely, when the layout of both the R and G filters is appropriately determined, the layout of the B filter is automatically fixed as the remainder of the determined layout of the R filter and the G filter. This is because a visually satisfactory image can be obtained by prioritizing the layout of the R and G filters than the layout of the B filter, which does not visually stand out.

Next, the control unit performs error diffusion processing for binarization on the pixel data I_G of the G plane. First, in step S38, the control unit inputs the pixel data I_G of the G plane into the G binarization unit 03.

If an exemplary embodiment uses four error diffusion coefficients (K1 through K4) illustrated in FIG. 4, the G cumulative error line buffer 10 of the G binarization unit 03 stores the following quantization errors. Namely, the G cumulative error line buffer 10 includes a storage area E_G0 and a plurality of storage areas E_G(x) (x=1 to W) equal in total number to the horizontal pixel number W of the input image. The G cumulative error line buffer 10 stores quantization errors according to a method described later. The G cumulative error line buffer 10 can initialize all data into initial values 0 or any random values before starting the processing. FIG. 5 illustrates detailed storage areas 52 of the G cumulative error line buffer 10.

In step S39, the control unit (the G cumulative error adding unit 11) adds, to the input pixel data, the error E_G(x) corresponding to the horizontal pixel position x of the input pixel data. The following formula (14) defines I_G' representing cumulative error-added pixel data, which can be calculated based on the input target pixel data I_G.

$$I\_G'=I\_G+E\_G(x) \quad (14)$$

In step S40, the control unit (the G threshold selection unit 12) selects a threshold T_G. In this case, an exemplary embodiment satisfies the following relationship.

$$t\_G=I\_RG-I\_G \quad (15)$$

The following formula expresses the threshold T_G.

$$T\_G(t\_G)=128$$

(0≦t_G≦255)

Otherwise, to eliminate any delay in filter generation, the threshold T_G can be finely changed according to t_G so as to decrease an averaged quantization error. According to this embodiment, I_RG−I_G is equal to or less than 255. Therefore, the control unit sets T_G(t_G)=128.

In step S41, the control unit (the G quantization unit 13) compares the error-added pixel data I_G' with the threshold T_G, and the above-described binarization result Out_RG (quantized value 0 or 255) of the total pixel data on the planes R and G. Then, the control unit determines a final binarization result Out_R of the R filter and a final binarization result Out_G of the G filter according to the following rules.

$$\text{Out\_G}=\text{Out\_RG} \quad (16)$$

$$\text{Out\_R}=0 \quad (17)$$

(I_G'≧T_G)

$$\text{Out\_G}=0 \quad (18)$$

$$\text{Out\_R}=\text{Out\_RG} \quad (19)$$

(I_G'<T_G)

The Control Unit Determines Binarization of the Pixel data Out_G of the G plane according to the above-described formulas (16) through (19). At the same time, the control unit determines binarization of the pixel data Out_R of the R plane. Namely, the final result Out_R of the R filter and the final result Out_G of the G filter are simultaneously fixed. The meaning of formula (16) is that the G filter is arranged. The meaning of formula (18) is that the G filter is not arranged.

In step S42, the control unit (the G error calculation unit 14) calculates a difference Err_G between the error-added pixel data I_G' (=target pixel data I_G+E_G(x)) and the output pixel data Out_G according to the following formula (20).

$$\mathrm{Err\_}G(x){=}I\_G'{-}\mathrm{Out\_}G \tag{20}$$

In step S43, the control unit (the G error diffusion unit 15) performs the following diffusion processing on the error Err_G(x) according to the horizontal pixel position x.

$$E\_G(x+1) \leftarrow E\_G(x+1)+\mathrm{Err\_}G(x) \times {}^{7}\!/{}_{16}(x{<}W)$$

$$E\_G(x-1) \leftarrow E\_G(x-1)+\mathrm{Err\_}G(x) \times {}^{3}\!/{}_{16}(x{>}1)$$

$$E\_G(x) \leftarrow E0\_G+\mathrm{Err\_}G(x) \times {}^{5}\!/{}_{16}(1{<}x{<}W)$$

$$E\_G(x) \leftarrow E0\_G+\mathrm{Err\_}G(x) \times {}^{8}\!/{}_{16}(x{=}1)$$

$$E\_G(x) \leftarrow E0\_G+\mathrm{Err\_}G(x) \times {}^{13}\!/{}_{16}(x{=}W)$$

$$E0\_G \leftarrow E\_G \times {}^{1}\!/{}_{16}(x{<}W)$$

$$E0\_G \leftarrow 0 (x{=}W)$$

Through the above-described processing, the control unit can complete the binarization (quantized value 0 or 255) for the pixel data I_G' of the G plane of the G filter for one pixel. At the same time, binarization (quantized value 0 or 255) for the pixel data I_R' of the R plane of the R filter is fixed.

The purpose of binarizing pixel data on the G plane of the G filter is to ensure an appropriate layout for the G plane. As a result of determining an appropriate layout for the G filter, a binarization result of pixel data I_R' of the R filter is automatically fixed. Namely, upon appropriately determining the layout of the G filter, the remainder is determined as the layout of the R filter.

This is because a visually satisfactory image can be obtained by prioritizing the layout of the G filter than the layout of the R filter, which does not visually stand out. However, as the total pixel data of the R, G, and B filters has been initially subjected to error diffusion processing, the overall layout for the R, G, and B filters is appropriate. Therefore, not only the layout of the R, G, and B filters can be determined appropriately as a whole but also the layout of the G filter, which visually stands out, can be optimized.

In short, the halftone processing according to an exemplary embodiment can appropriately determine the layout for the R, G, and B filters of the color image sensor as a whole while ensuring an optimized layout for the G filter.

In step S44, the control unit determines whether the above-described processing has been accomplished for all pixels. If the control unit determines that the above-described processing has been accomplished for all pixels (YES in step S44), the control unit terminates the halftone processing.

As described above, the color filter layout processing according to an exemplary embodiment can determine an appropriate layout for respective color filters such that a frequency component of array of color filters of each color includes a reduced amount of component in a low-frequency region and an increased amount of component in a high-frequency region. Namely, the color filter layout according to an exemplary embodiment includes blue noise characteristics. A color filter layout according to an example embodiment is different from the Bayer array or other regular array and can reduce generation of color moire and remove noise components from a captured image without using a conventional optical low-pass filter, even if an object to be imaged has periodic changes in luminance.

Second Exemplary Embodiment

Figure 6:
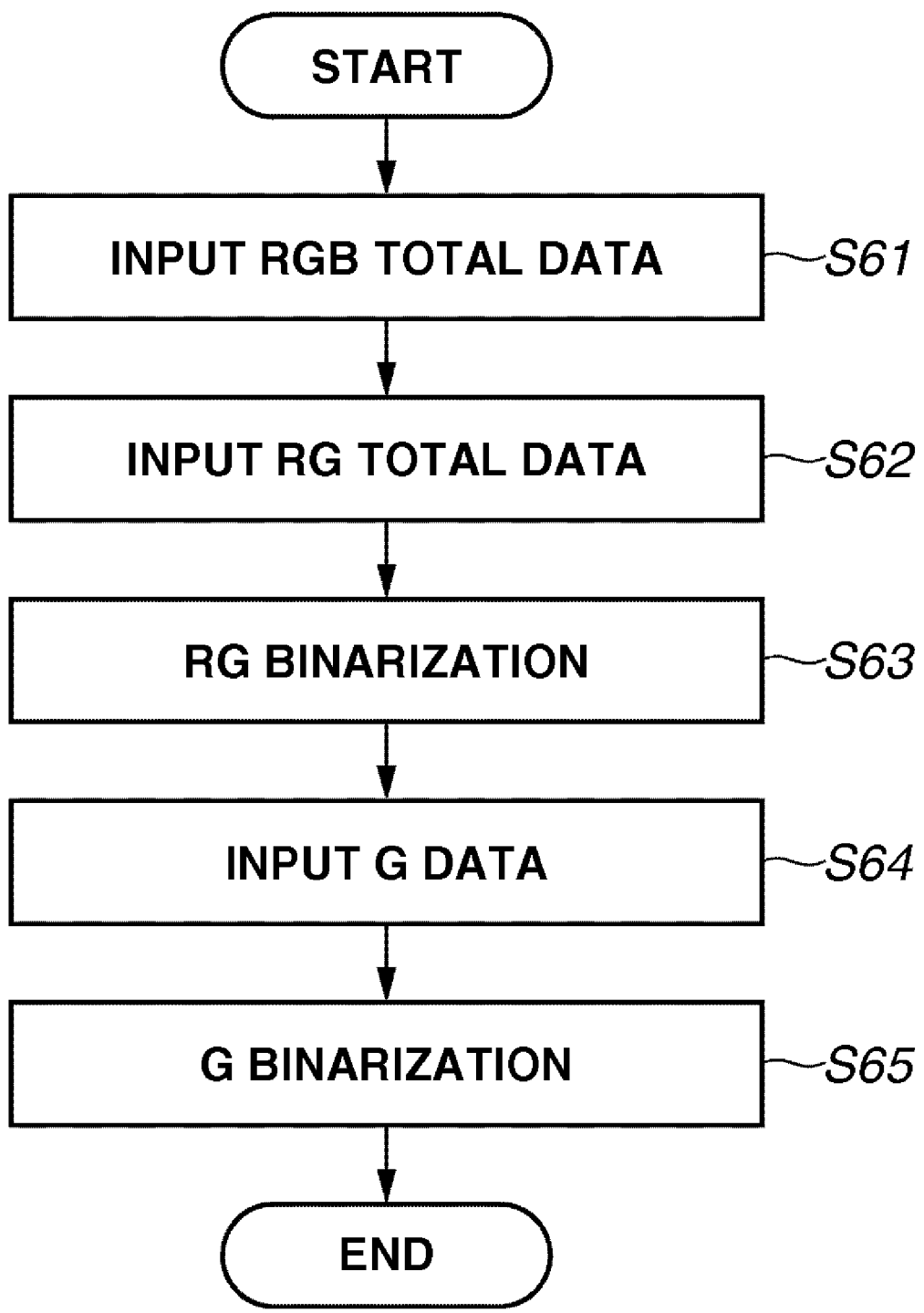
FIG. 6 is a flowchart illustrating example halftone processing performed by the information processing apparatus according to a second exemplary embodiment of the present invention.

A second exemplary embodiment of the present invention is different from the above-described first exemplary embodiment in that the control unit performs halftone processing according to a flowchart illustrated in FIG. 6. The second exemplary embodiment includes various elements similar to those described in the first exemplary embodiment (the system configuration illustrated in FIG. 1, and the color filter layout determination processing illustrated in FIG. 2) and they may not be described below.

As discussed in U.S. Pat. No. 4,920,501 to Sullivan and Miller, there is a conventional method for converting multi-valued input image data to be subjected to halftone processing into binary image data having higher dispersion in dot layout, namely, having spatial frequency components in a high-frequency region only. However, the conversion method is not limited to this conventional method. An exemplary embodiment can use any other method for generating image data including blue noise characteristics.

An example binarization method usable for the halftone processing is described below. According to an exemplary embodiment, image data of RGB planes having been subjected to the color separation processing is 8-bit image data of 0 to 255.

FIG. 6 is a flowchart illustrating example halftone processing performed by the information processing apparatus according to an exemplary embodiment. In FIG. 6, when the control unit performs binarization processing (for obtaining quantized value 0 or 255) on the pixel data of the RGB planes, the control unit obtains total pixel data I_RGB of the RGB planes.

In step S61, the control unit inputs the total pixel data I_RGB of the RGB planes into the RGB summing unit 01.

$$I\_RGB{=}I\_R{+}I\_G{+}I\_B \tag{25}$$

Next, the control unit (the RG binarization unit 02) binarizes the total pixel data I_RG on the R and G planes to quantize (0, 255) the total pixel data on the R and G planes. In step S62, the control unit inputs the total pixel data I_RG of the R and G planes into the RG binarization unit 02. The following formula (26) expresses I_RG.

$$I\_RG{=}I\_R{+}I\_G \tag{26}$$

In step S63, the control unit (the RG binarization unit 02) performs binarization processing on total pixel data of the R and G planes according to the method discussed in U.S. Pat. No. 4,920,501 to Sullivan and Miller. Through this processing, the control unit calculates a quantization result Out_RG of total pixel data on the R and G planes. At the same time, the control unit calculates a final output value Out_B of pixel data of the B filter according to the following formula (27).

$$\mathrm{Out\_}B{=}\mathrm{Out\_}RGB{-}\mathrm{Out\_}RG \tag{27}$$

The meaning of the binarization applied to the total pixel data on the R and G planes is described below. The relationship Out_RG=255 indicates that either the R filter or the G filter is arranged on this position (photoelectric conversion element). Namely, Out_RG=255 indicates that the filter layout at this position is not fixed. However, the determination finalized at this moment is that at least one of the R filter and the G filter is arranged on this position.

Furthermore, Out_RG=0 indicates that neither of the R filter and the G filter is arranged on this position (photoelectric conversion element). Namely, Out_RG=0 indicates that the B filter is arranged on this position.

The foregoing description can be summarized in the following manner.

Out_RG=0 indicates that neither of the R and G filters is arranged. Namely, it is determined that the B filter is arranged.

Out_RG=255 indicates that either the R filter or the G filter is arranged.

The purpose of binarizing total pixel data on the R and G planes is to ensure an appropriate filter layout for the R and G planes as a whole although the filter layout of respective planes is not fixed. A binarization result of pixel data I_B for the B filter is automatically determined as the remainder of the determined layout of the R and G filters.

Namely, determining an appropriate layout for the R and G filters is prioritized than determining a layout for the B filter. This is because a satisfactory image can be obtained by prioritizing the layout for the R and G filters than the layout for the B filter, which does not visually stands out.

Next, the control unit (the G binarization unit 03) binarizes pixel data I_G on the G plane to perform quantization (0, 255). In step S64, the control unit inputs pixel data I_G of the G plane into the G binarization unit 03.

In step S65, the control unit binarizes pixel data on the G plane according to the method discussed in U.S. Pat. No. 4,920,501 to Sullivan and Miller. In the quantization of pixel data on the G plane, the control unit takes the following conditions into consideration.

1. A portion where the quantized value of pixel data on the G plane becomes 255 is limited to a portion where the quantized value of total pixel data of two planes of the R and G filters becomes 255.
2. A portion where the quantized value of pixel data on the G plane becomes 0 is limited to a portion where the quantized value of total pixel data of two planes of the R filter and the G filter becomes 0.

When the quantization for the pixel data on the G plane is completed, a quantized value Out_R of pixel data on the R plane can be obtained according to the following formula (28).

$$Out\_R = Out\_RG - Out\_G \quad (28)$$

Through the above-described processing, the control unit can complete the binarization (quantized value 0 or 255) for the pixel data I_G of the G plane of the G filter for one pixel. At the same time, the control unit can fix a binarization result (quantized value 0 or 255) for pixel data I_R of the R plane of the R filter.

The purpose of binarizing pixel data on the G plane of the G filter is to ensure an appropriate layout for the G plane. A binarization result of pixel data I_R for the R filter is automatically fixed as the remainder of the determined layout of the G filter. Namely, determining an appropriate layout for the G filter is prioritized than determining a layout for the R filter.

This is because a visually satisfactory image can be obtained by prioritizing the layout of the G filter than the layout of the R filter, which does not visually stand out. However, as the total pixel data of the R, G, and B filters has been initially subjected to the quantization processing, the layout of the R, G, and B filters is appropriate as a whole. Therefore, the layout of the R, G, and B filters can be determined appropriately as a whole. The layout of the G filter, which visually stands out, can be optimized by alone.

In short, the halftone processing according to an exemplary embodiment can appropriately determine the layout for the R, G, and B filters of the color image sensor as a whole while ensuring an optimized layout for the G filter.

As described above, similar to the above-described first exemplary embodiment, the second exemplary embodiment can provide a color imaging apparatus capable of reducing generation of color moire and removing noise components from a captured image. The present invention is not limited to the above-described first and second exemplary embodiments, which describe the color filter layout of three colors (RGB). The present invention can be applied to any other layout of multiple color filters.

Third Exemplary Embodiment

Figure 7:
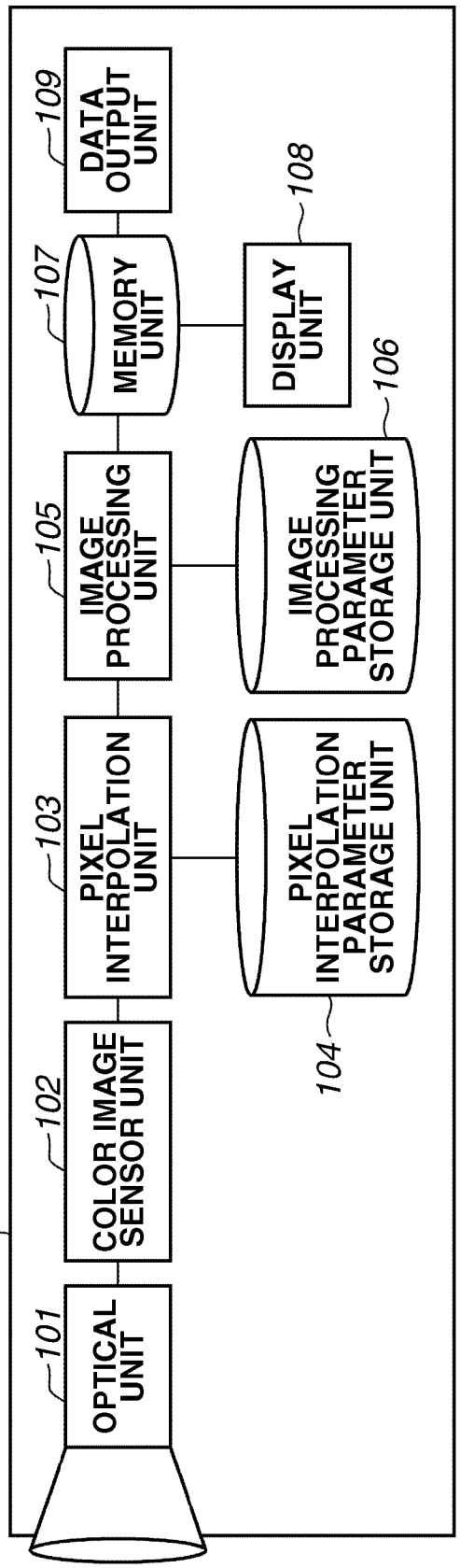
FIG. 7 is a block diagram illustrating an example imaging apparatus according to a third exemplary embodiment of the present invention.

FIG. 7 is a block diagram illustrating an example configuration of a color imaging apparatus 1 according to a third exemplary embodiment of the present invention. The color imaging apparatus 1 has the following configuration.

An optical unit 101 includes a lens and an optical low-pass filter (LPF). A color image sensor unit 102 includes a plurality of color filters arrayed in a mosaic pattern and image sensor elements (CCD or CMOS). A pixel interpolation unit 103 interpolates image information of the mosaic pattern output from the color image sensor unit 102 and calculates color image information of a plurality of independent planes.

An image processing unit 105 performs image processing (color processing, noise reduction processing, sharpness improvement processing) on the color image information of the independent planes. A pixel interpolation parameter storage unit 104 stores digital filter parameters required for the pixel interpolation. An image processing parameter storage unit 106 stores image processing parameters (color processing parameters, noise reduction processing parameters, and sharpness improvement processing parameters) and other data.

A memory unit 107 stores the images having been subjected to the processing performed by the image processing unit 105. A display unit 108 (such as a liquid crystal display unit) displays an image being currently shot or having been shot, or an image subjected to the image processing. The pixel interpolation unit 103 performs pixel interpolation processing using the digital filter parameters stored in the pixel interpolation parameter storage unit 104. The image processing unit 105 performs image processing using the image processing parameters stored in the image processing parameter storage unit 106. A data output unit 109 is connectable to a printer via a cable. A memory card or other recording medium is connectable to the data output unit 109.

Figure 8:
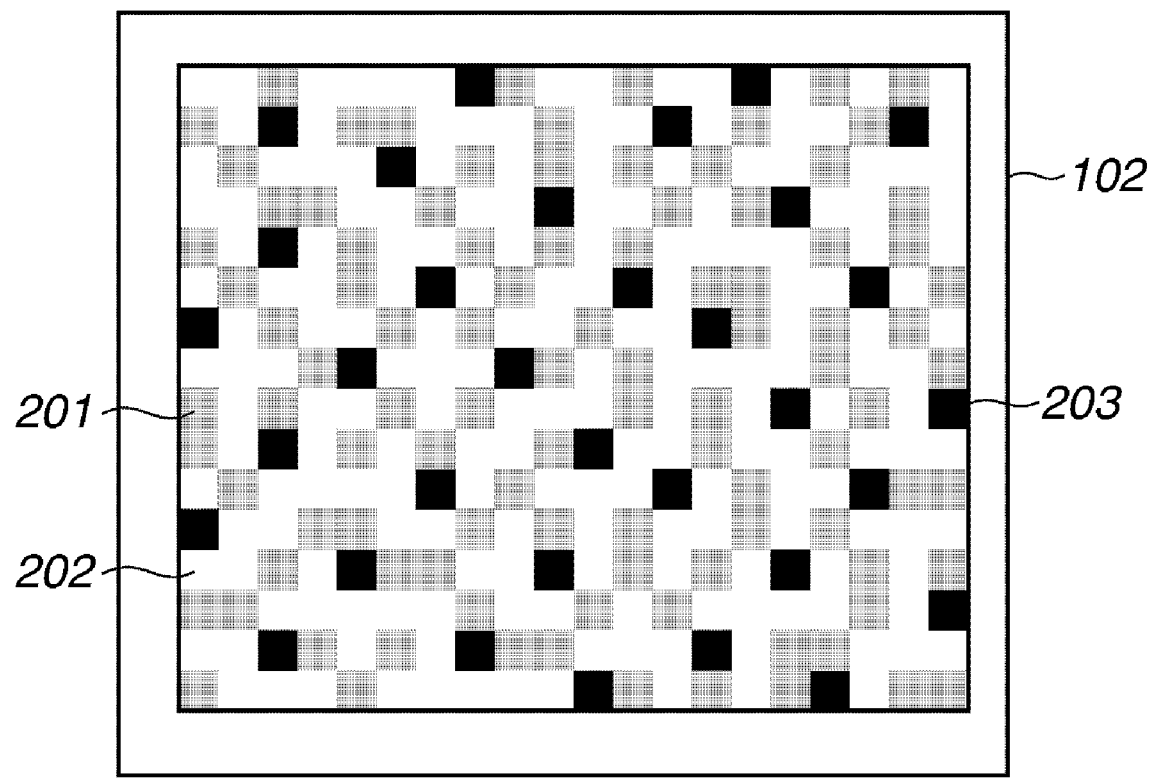
FIG. 8 illustrates an example configuration of a color image sensor.

FIG. 8 illustrates an example configuration of the color image sensor unit 102. According to an exemplary embodiment, three color filters of red (R) 201, green (G) 202, and blue (B) 203 are mounted on respective color image sensor elements of the color image sensor unit 102.

Figure 9:
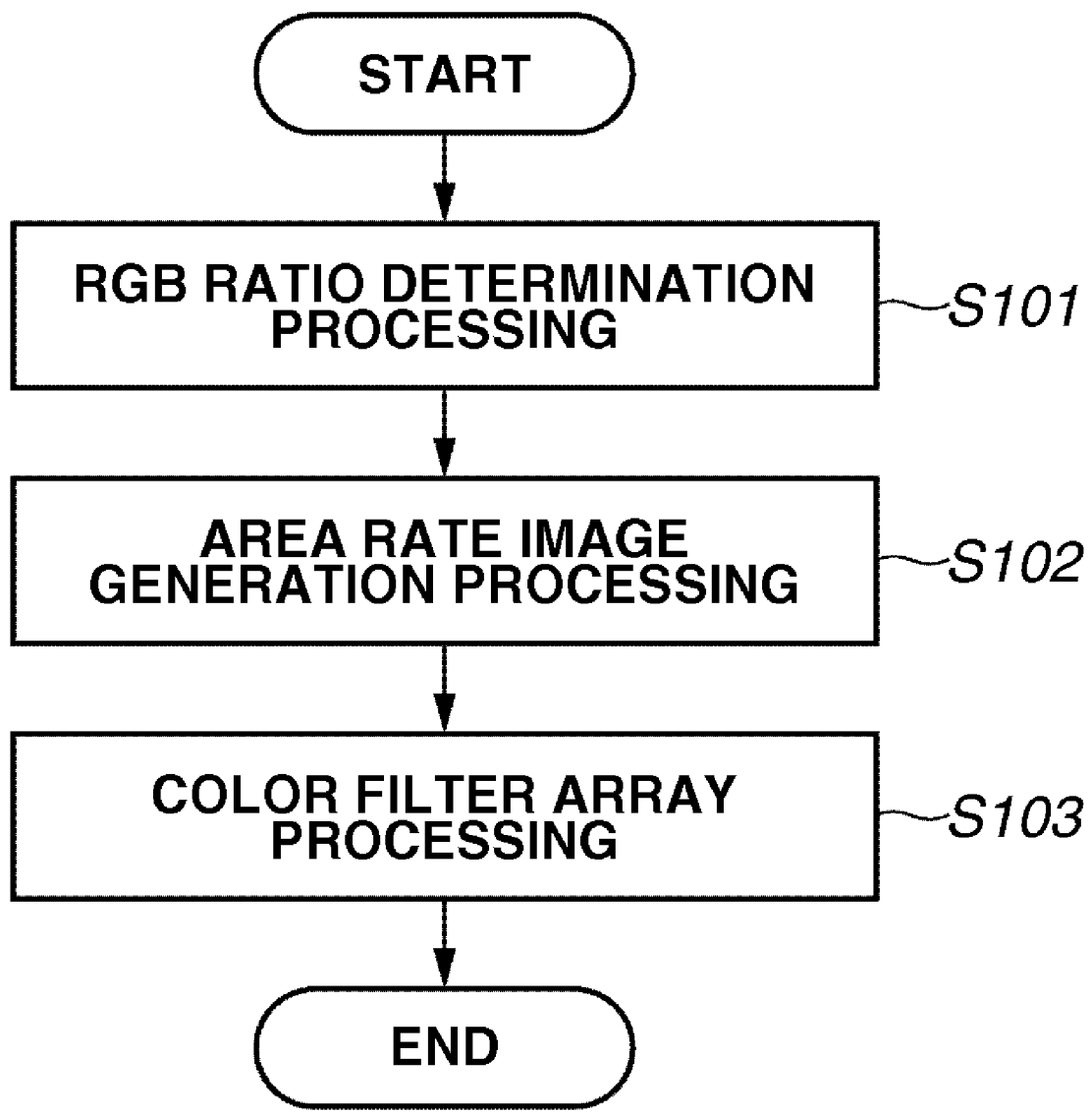
FIG. 9 is a flowchart illustrating example processing for determining color filter arrays of the color image sensor.

An example method for determining a color filter array for the color image sensor unit 102 is described below with reference to a flowchart illustrated in FIG. 9. In step S101, the control unit of the information processing apparatus determines area rates of RGB color filters (RGB ratio) in an area where the color filters are arrayed. According to an exemplary embodiment, the control unit sets the RGB ratio to RGB=3:6:1, which reflects the ratio in visual sensitivity. However, the control unit can set any other RGB ratio. For example, the control unit can set an RGB ratio that reflects a human LMS cone ratio or can set an RGB ratio of 1:2:1 similar to that of the Bayer array.

In step S102, the control unit generates an 8-bit area rate image based on the determined RGB ratio so that each of RGB planes has uniform pixel values and the sum of pixel values on the RGB planes is equal to 255. According to this embodiment, the RGB ratio is set to 3:6:1.

The following formula (29) defines an area rate I_R of the R plane.

$$I\_R = 2^{(bit\ number)} \times (\text{rate of } R) / (\text{rate of } R + \text{rate of } G + \text{rate of } B) \quad (29)$$

$$= 2^8 \times 3/(3+6+1) \approx 76$$

The following formula (30) defines an area rate I_G of the G plane.

$$I\_G = 2^{(bit\ number)} \times (\text{rate of } G) / (\text{rate of } R + \text{rate of } G + \text{rate of } B) \quad (30)$$

$$= 2^8 \times 6/(3+6+1) = 153$$

The following formula (31) defines an area rate I_B of the B plane.

$$I\_B = 2^{(bit\ number)} - (\text{area rate value of } R \text{ plane} + \text{area rate value of } G \text{ plane}) \quad (31)$$

$$= 2 - (76+153) = 26$$

A horizontal width W and a vertical width H of this image are identical to or larger than the horizontal number and the vertical number of color image sensor elements to be arrayed. Each color plane of an area rate image is a uniform image having a pixel value corresponding to the area rate. More specifically, an R area rate image is an image having every pixel value of 76 and a size of W*H, a G area rate image is an image having every pixel value of 153 and a size of W*H, and a B area rate image is an image having every pixel value of 26 and a size of W*H.

In step S103, the control unit performs processing for determining the color filter array such that low-frequency components of the array can be reduced.

Figure 10:
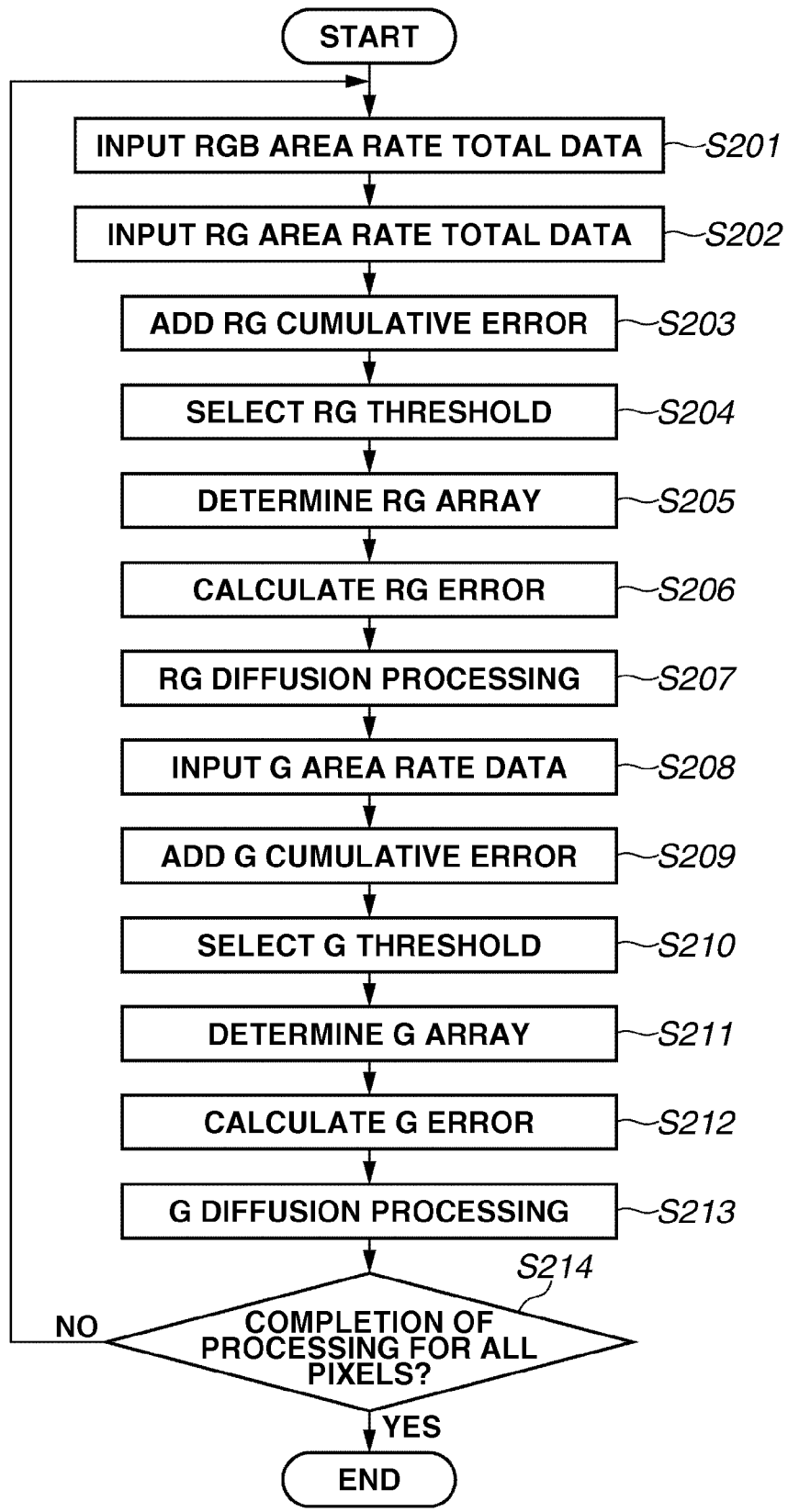
FIG. 10 is a flowchart illustrating example color filter array processing.

The processing for determining the color filter array (processing performed in step S103) is described with reference to a flowchart illustrated in FIG. 10 and a block diagram illustrated in FIG. 11. The color filter array processing according to an exemplary embodiment can be performed according to the error diffusion method ("An adaptive algorithm for spatial gray scale", SID International Symposium Digest of Technical Papers, vol 4.3, 1975, pp. 36-37) introduced by R. Floyd et al. The RGB area rate image according to an exemplary embodiment is an 8-bit image of 0 to 255.

In step S201, the control unit inputs RGB area rate total data I_RGB into an RGB summing unit 301. According to an exemplary embodiment, the RGB area rate total data is equal to 255 (the sum of (29), (30), and (31) values).

$$I\_RGB = I\_R + I\_G + I\_B \quad (32)$$

Figure 11:
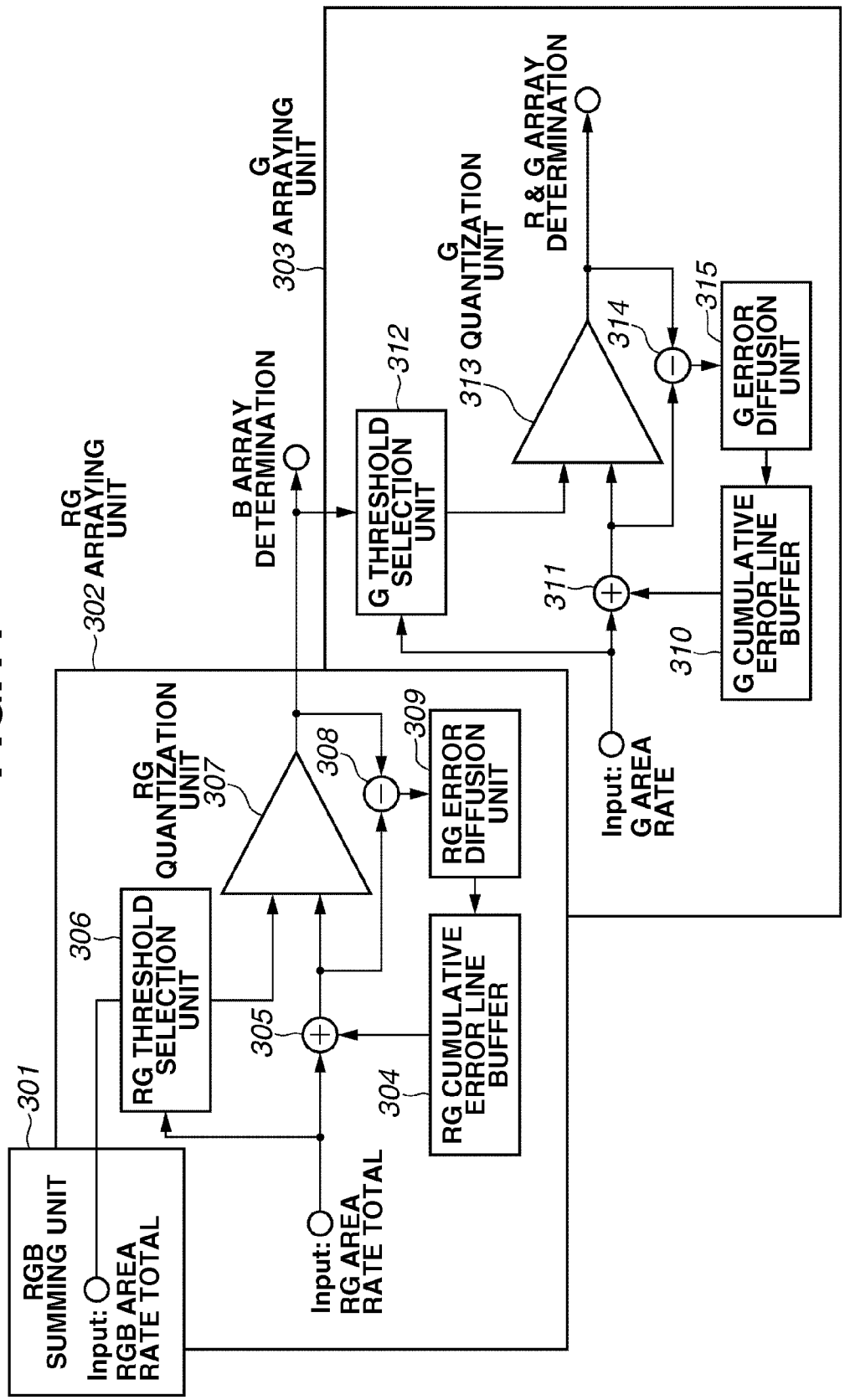
FIG. 11 is a block diagram illustrating an example circuit configured to determine a color filter array.

In step S202, the control unit inputs RG area rate total data I_RG into an RG arraying unit 302 illustrated in FIG. 11. According to an exemplary embodiment, the RG area rate total data is equal to 229 (a sum of (29) and (30) values).

$$I\_RG = I\_R + I\_G \quad (33)$$

Figure 12:
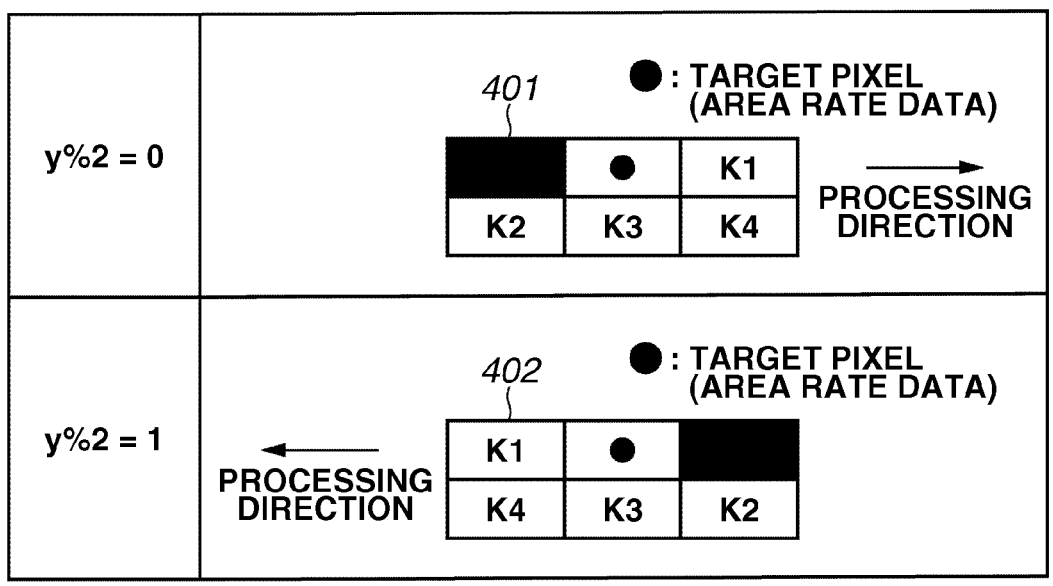
FIG. 12 illustrates example error diffusion coefficients.

If an exemplary embodiment uses four error diffusion coefficients K1 through K4 illustrated in FIG. 12, an RG cumulative error line buffer 304 of the RG arraying unit 302 illustrated in FIG. 11 includes a storage area E_RG0 and a plurality of storage areas E_RG(x) ($0 \leq x \leq W-1$) equal in total number to the number W of horizontal pixels of the input image. The RG cumulative error line buffer 304 stores quantization errors according to a method described later. The RG cumulative error line buffer 304 can initialize all data into initial values 0 or any random values before starting the processing. FIG. 13 illustrates detailed storage areas 304 of the RG cumulative error line buffer 304.

In step S203, the control unit (RG cumulative error adding unit 305) adds, to the input target pixel (RG area rate total data), an error E_RG(x) corresponding to the horizontal pixel position x of the RG area rate total data. Namely, the following formula (34) defines I_RG' representing cumulative error-added data, which can be calculated based on the input target pixel I_RG.

$$I\_RG' = I\_RG + E\_RG(x) \quad (34)$$

In step S204, an RG threshold selection unit 306 selects a threshold T_RG. In this case, an exemplary embodiment satisfies the following relationship.

$$t\_RG = I\_RGB - I\_RG \quad (35)$$

The following formula (36) expresses the threshold T_RG.

$$T\_RG(t\_RG) = 128 \quad (36)$$

($0 \leq t\_RG \leq 255$)

To eliminate any delay in array generation, the threshold T_RG can be finely changed according to t_RG so as to decrease an averaged quantization error.

In step S205, an RG quantization unit 307 compares the error-added RG area rate total data I_RG' with the threshold T_RG and determines an output value Out_RG and a B color filter array Out_B according to the following rules.

$$\text{If } I\_RG' < T\_RG, \quad (37)$$

$$\text{Out\_RG} = 0 \quad (38)$$

$$\text{Out\_B} = 1 \quad (39)$$

$$\text{And, if } I\_RG' \geq T\_RG, \quad (40)$$

$$\text{Out\_RG} = 1 \quad (41)$$

$$\text{Out\_B} = 0 \quad (42)$$

The RG quantization unit 307 determines the array Out_RG (quantized value 0 or 1) of the RG area rate total data according to formulas (37) through (42). At the same time, the RG quantization unit 307 determines an array Out_B (quantized value 0 or 1) of the B area rate data. Namely, a final result Out_B of the B color filter array is fixed at this moment. When Out_B is 1, it indicates that the B filter is arranged. When Out_B is 0, it indicates that the B filter is not arranged.

The meaning of determining the array of the RG area rate total data is described below. Out_RG=1 indicates that either the R color filter or the G filter is arranged on this pixel. Namely, if Out_RG=0, neither of the R filter and the G filter is disposed. Namely, the B filter is arranged. If Out_RG=1, either the R filter or the G filter is arranged.

In step S206, an RG error calculation unit 308 calculates a difference Err_RG between the pixel data I_RG' and the output value Out_RG according to formula (43).

$$\text{Err\_RG}(x) = I\_RG' - (\text{Out\_RG} \times 255) \quad (43)$$

In step S207, an RG error diffusion unit 309 diffuses the error Err_RG(x) according to the horizontal pixel position x. The direction of the processing performed by the RG error diffusion unit 309 varies depending on the vertical address of a pixel to be processed. For example, if the vertical address (y($0 \leq y \leq H-1$)) is dividable by 2, the RG error diffusion unit 309 performs the processing from left to right as indicated by 401 in FIG. 12 and diffuses the error according to the following formula (44). On the other hand, if the vertical address (y(0≦y≦H−1)) is not dividable by 2, the RG error diffusion unit 309 performs the processing from right to left as indicated by 402 in FIG. 12 and diffuses the error according to the following formula (45).

If y % 2=0 (0≦y≦H−1 and % is a residue mark), $$E\_RG(x+1) \leftarrow E\_RG(x+1) + \text{Err}\_RG(x) \times K1 \, (x<W-1)$$

$$E\_RG(x-1) \leftarrow E\_RG(x-1) + \text{Err}\_RG(x) \times K2 \, (x>0)$$

$$E\_RG(x) \leftarrow E0\_RG + \text{Err}\_RG(x) \times K3$$

$$E0\_RG \leftarrow E\_RG \times K4 \, (x<W-1)$$

$$E0\_RG \leftarrow 0 \, (x=W-1) \tag{44}$$

If y %2=1 (0≦y≦H and % is a residue mark), $$E\_RG(x-1) \leftarrow E\_RG(x-1) + \text{Err}\_RG(x) \times K1 \, (x>0)$$

$$E\_RG(x+1) \leftarrow E\_RG(x+1) + \text{Err}\_RG(x) \times K2 \, (x<W-1)$$

$$E\_RG(x) \leftarrow E0\_RG + \text{Err}\_RG(x) \times K3$$

$$E0\_RG \leftarrow E\_RG \times K4 \, (x>0)$$

$$E0\_RG \leftarrow 0 \, (x=0) \tag{45}$$

According to an exemplary embodiment, the coefficients K1 through K4 are set to K1=7/16, K2=3/16, K3=5/16, and K4=1/16 although the coefficients K1 through K4 can be changed according to t_RG, I_RG, or I_B.

Through the above-described processing, determination of the array Out_RG (quantized value 0 or 1) for the RG area rate total data I_RG for one pixel is accomplished. At the same time, an array Out_B (quantized value 0 or 1) result of the B filter is fixed. Determining the array of the RG area rate total data I_RG can identify a pixel on which the R filter or the G filter is arranged. Then, the pixel on which neither of the R and G color filters is arranged is determined as a pixel on which the B color filter is arranged. Namely, R, G, and B are not arranged on the same position.

Next, the control unit performs error diffusion processing on G area rate data I_G to determine an array. In step S208, the control unit inputs G area rate data I_G into a G arraying unit 303 illustrated in FIG. 11. If an exemplary embodiment uses four error diffusion coefficients K1 through K4 illustrated in FIG. 12, the G arraying unit 303 includes a G cumulative error line buffer 310 having a configuration similar to that of the RG cumulative error line buffer 304. More specifically, as indicated by 310 in FIG. 13, the G cumulative error line buffer 310 includes a storage area E_G0 and a plurality of storage areas E_G(x) (x=0 to W−1) equal in total number to the number W of horizontal pixels of the input image. The G cumulative error line buffer 310 stores quantization errors.

In step S209, the control unit (G cumulative error adding unit 311) adds, to the input target pixel (G area rate data), an error E_G(x) corresponding to the horizontal pixel position x of the input G area rate data. The following formula (46) defines I_G' representing cumulative error-added data, which can be calculated based on the input target pixel value (G area rate data) I_G.

$$I\_G' = I\_G + E\_G(x) \tag{46}$$

In step S210, a G threshold selection unit 312 selects a threshold T_G. In this case, an exemplary embodiment satisfies the following relationship.

$$t\_G = I\_RG - I\_G \tag{47}$$

The following formula (48) expresses the threshold T_G.

$$T\_G(t\_G) = 128 \tag{48}$$

(0≦t_G≦255)

To eliminate any delay in array generation, the threshold T_G can be finely changed according to t_G to reduce an averaged quantization error.

In step S211, a G quantization unit 313 compares the error-added G area rate data I_G' with the threshold T_G (t_G), and the above-described array result Out_RG (quantized value 0 or 1) of the RG area rate total data. The G quantization unit 313 determines a finalized R filter array result Out_R and a finalized G filter array result Out_G according to the following rules.

$$\text{If } I\_G' \geq T\_G \tag{49}$$

$$\text{Out\_G} = \text{Out\_RG} \tag{50}$$

$$\text{Out\_R} = 0 \tag{51}$$

$$\text{If } I\_G' < T\_G \tag{52}$$

$$\text{Out\_G} = 0 \tag{53}$$

$$\text{Out\_R} = \text{Out\_RG} \tag{54}$$

The G quantization unit 313 determines the array of the G filter and the array of the R filter simultaneously according to formulas (49) through (54). Namely, the R filter final result Out_R and the G filter final result Out_G can be simultaneously determined. The meaning of formula (50) is that the G filter is arranged if Out_RG=1 and not arranged if Out_RG=0. Furthermore, the meaning of formula (53) is that the G filter is not arranged.

As apparent from formulas (50) and (51) or (53) and (54), a sum of results satisfies the following condition (55).

$$\text{Out\_RG} = \text{Out\_G} + \text{Out\_R} \tag{55}$$

Namely, formulas (49) through (54) can be modified in the following manner.

$$\text{If Out\_RG} \cdot I\_G' \geq T\_G, \tag{49}'$$

$$\text{Out\_G} = 0 \tag{50}'$$

$$\text{Out\_R} = \text{Out\_RG} \tag{51}'$$

$$\text{If Out\_RG} \cdot I\_G' < T\_G, \tag{50}'$$

$$\text{Out\_G} = \text{Out\_RG} \tag{53}$$

$$\text{Out\_R} = 0 \tag{54}$$

In step S212, a G error calculation unit 314 calculates a difference Err_G between the error-added G area rate data I_G' and the output value Out_G according to the following formula (56).

$$\text{Err}\_G(x) = I\_G' - (\text{Out}\_G \times 255) \tag{56}$$

In step S213, a G error diffusion unit 315 diffuses the error Err_G(x) according to the horizontal pixel position x. The direction of the processing performed by the G error diffusion unit 315 varies depending on the vertical address of a target pixel. For example, if the vertical address (y(0≦y≦H−1)) is dividable by 2, the G error diffusion unit 315 performs the processing from left to right as indicated by 401 illustrated in FIG. 12 and diffuses the error according to the following formula (57). On the other hand, if the vertical address (y(0≦y≦H−1)) is not dividable by 2, the G error diffusion unit 315 performs the processing from right to left as indicated by 402 illustrated in FIG. 12 and diffuses the error according to formula (58).

If y % 2=0 (0≦y≦H−1 and % is a residue mark), $$E\_G(x+1) \leftarrow E\_G(x+1) + \text{Err}\_G(x) \times K1 (x<W-1)$$

$$E\_G(x-1) \leftarrow E\_G(x-1) + \text{Err}\_G(x) \times K2 (x>0)$$

$$E\_G(x) \leftarrow E0\_G + \text{Err}\_G(x) \times K3$$

$$E0\_G \leftarrow E\_G \times K4 (x>W-1)$$

$$E0\_G \leftarrow 0 (x=W-1) \tag{57}$$

If y % 2=1 (0≦y≦H and % is a residue mark), $$E\_G(x-1) \leftarrow E\_G(x-1) + \text{Err}\_G(x) \times K1 (x>0)$$

$$E\_G(x+1) \leftarrow E\_G(x+1) + \text{Err}\_G(x) \times K2 (x<W-1)$$

$$E\_G(x) \leftarrow E0\_G + \text{Err}\_G(x) \times K3$$

$$E0\_G \leftarrow E\_G \times K4 (x>0)$$

$$E0\_G \leftarrow 0 (x=0) \tag{58}$$

According to an exemplary embodiment, the coefficients K1 through K4 are set to K1=7/16, K2=3/16, K3=5/16, and K4=1/16 although the coefficients K1 through K4 can be changed according to input gradation value t_G or I_G.

Through the above-described processing, determination of the array Out_G (quantized value 0 or 1) for the G filter for one pixel is accomplished. At the same time, the arrayed Out_R (quantized value 0 or 1) result of the R filter is fixed. Next, in step S214, the control unit determines whether the above-described processing has been completed for all pixels. If the above-described processing has been completed for all pixels (YES in step S214), the control unit accomplishes the color filter array processing performed in step S103.

The color filter array processing according to an exemplary embodiment can prioritize the array of the G color filter. Namely, the color filter array processing according to an exemplary embodiment can ensure that the prioritized G filter array has a smaller amount of low-frequency component. Then, as a result of determining the layout of the G filter, an array result of the R filter is fixed. However, as the R filter array is an array having been subjected to the error diffusion processing, the R filter array has characteristics including a reduced amount of component in a low-frequency region and a band component in a high-frequency region.

According to the above-described embodiment, the G color filter array is prioritized. However, according to another exemplary embodiment, any other color filter array can be prioritized. As a result, for each of RGB color filter arrays, an exemplary embodiment can realize appropriate characteristics having sufficient high-frequency components and a reduced amount of low-frequency components. Furthermore, an exemplary embodiment can greatly reduce low-frequency components of a prioritized color filter compared to low-frequency components of other color filters.

FIG. 14 illustrates example array patterns, frequency characteristics, and features of a Bayer array, a color filter array (random array) according to Japanese Patent Application Laid-Open No. 2000-299871, and a color filter array according to an exemplary embodiment.

FIG. 14 illustrates a Bayer array 501, a random array 502, and an array 503 according to an exemplary embodiment. The Bayer array 501 is a color filter array having an area ratio of RGB=1:2:1. The random array 502 and the color filter array 503 according to an exemplary embodiment are color filter arrays having an area ratio of RGB=3:6:1. Furthermore, FIG. 14 illustrates frequency characteristics 504, 505, and 506 of the above-described three types of color filter arrays.

The frequency characteristics 504 include a line spectrum in a high-frequency region. The frequency characteristics 505 include a large amount of components in both low-frequency and high-frequency regions. On the other hand, the frequency characteristics 506 of the color filter array according to an exemplary embodiment has a reduced amount of component in a low-frequency region and a band component in a high-frequency region.

The human vision is "sensitive to low-frequency components and insensitive to high-frequency components." Therefore, to reduce noise components of an image, it is desired to reduce low-frequency components of a color filter array. As apparent from the frequency characteristics 505, the random array 502 includes noise due to a large amount of low-frequency components. On the other hand, the color filter array 503 according to an exemplary embodiment does not include any noise because the color filter array 503 has a minimal amount of low-frequency component.

The moire occurs in capturing an image having a high-frequency and regular pattern because a high-frequency and regular pattern interferes with a regular color filter array. Therefore, the Bayer array 501 tends to generate a moire because the Bayer array 501 has regularity in a high-frequency region (namely, has a line spectrum in a high-frequency region). On the other hand, the color filter array 503 according to an exemplary embodiment has a random spectrum in a high-frequency region (namely, has a band component in a high-frequency region) and, therefore, does not tend to generate a moire. In short, the color filter array 503 according to an exemplary embodiment is far from generation of noise and moire.

Figure 15:
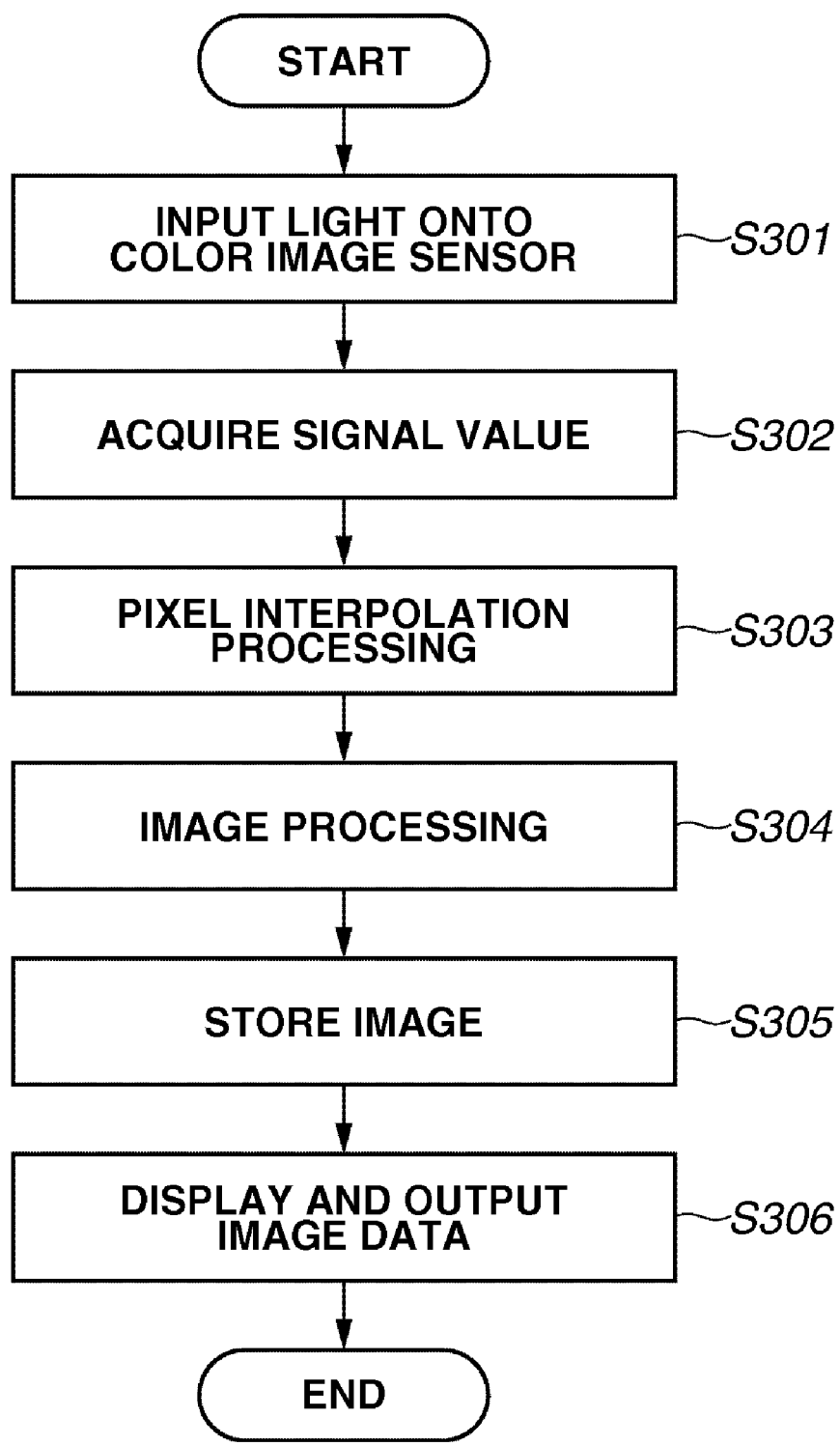
FIG. 15 is a flowchart illustrating example processing performed by a color imaging apparatus.

The color imaging apparatus 1 incorporating the color image sensor unit 102 that includes a color filter array obtained by the above-described processing can perform example processing described below with reference to a block diagram illustrated in FIG. 7 and a flowchart illustrated in FIG. 15.

In step S301, the light from an object passes through the optical unit 101 (including a lens and an optical LPF) and enters the color image sensor unit 102.

In step S302, the color image sensor unit 102 allows only the specific light wavelength components to pass through color filters. The color image sensor unit 102 performs photoelectric conversion and A/D conversion on the input light to obtain discrete signal values.

The color filter according to an exemplary embodiment has three different spectral sensitivities to red (R) 201, green (G) 202, and blue (B) 203 illustrated in FIG. 8. As described above, the color filter array has a reduced amount of component in a low-frequency region and a band component in a high-frequency region.

The color filter is configured to obtain color information with a single light receiving surface. Therefore, an image signal obtained in image capturing of an object is color information RGB_m(x, y) of a single plane according to the above-described color filter array. The discrete signal value according to an exemplary embodiment is a value of 8-bit (0 to 255) or larger bit number.

In step S303, the color imaging apparatus 1 acquires images R_p, G_p, and B_p of three independent planes from the discrete signal values RGB_m(x, y) of a single plane obtained by the above-described color filter array. More specifically, using the pixel interpolation parameters stored in the pixel interpolation parameter storage unit 104, the pixel interpolation unit 103 performs pixel interpolation processing on images R_m, G_m, and B_m separated into respective color signals.

The pixel interpolation parameter storage unit 104 stores color filter array information (1-bit information of 0 or 1) of Out_R obtained according to formulas (51) and (54), Out_G according to formulas (50) and (53), and Out_B according to formulas (39) and (42). Furthermore, the pixel interpolation parameter storage unit 104 stores pixel interpolating digital filters F_R, F_G, and F_B.

Figure 16:
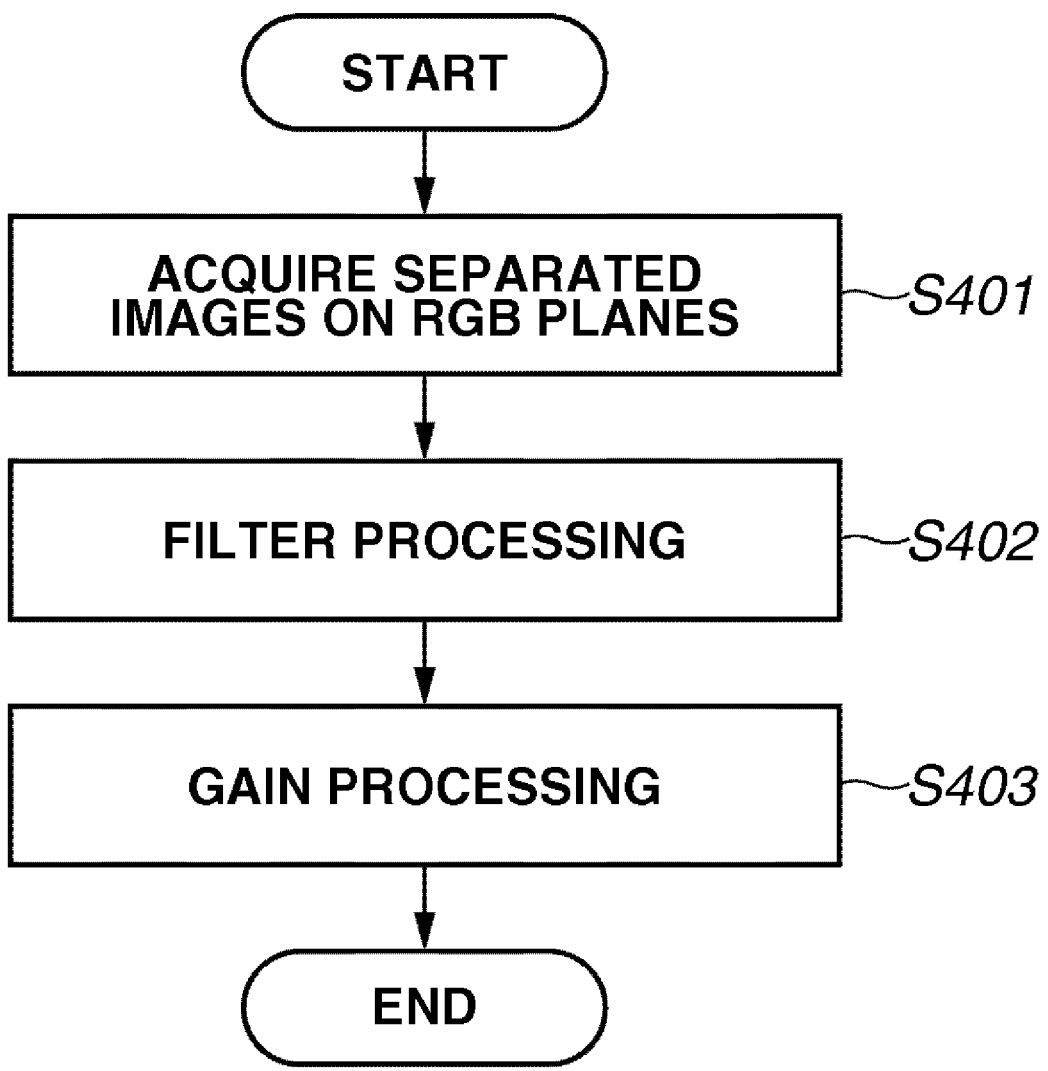
FIG. 16 is a flowchart illustrating example pixel interpolation processing.

Next, example pixel interpolation processing according to an exemplary embodiment (processing in step S303) is described with reference to a flowchart illustrated in FIG. 16 and a conceptual view illustrated in FIG. 17.

In step S401, the pixel interpolation unit 103 acquires the separated images R_m, G_m, and B_m by multiplying RGB_m(x, y) with Out_R(x,y), Out_G(x,y), and Out_B(x,y) respectively. FIG. 17 illustrates an example separated image G_m 601 of a green leaf.

$$R\_m(x,y)=RGB\_m(x,y) \times Out\_R(x,y) \quad (59)$$

$$G\_m(x,y)=RGB\_m(x,y) \times Out\_G(x,y) \quad (60)$$

$$B\_m(x,y)=RGB\_m(x,y) \times Out\_B(x,y) \quad (61)$$

In step S402, the pixel interpolation unit 103 acquires pixel interpolation-completed images R_p, G_p, and B_p (602 illustrated in FIG. 17) from the separated images R_m, G_m, and B_m using the pixel interpolating digital filters F_R, F_G, and F_B.

According to an example embodiment, the pixel interpolating digital filters F_R, F_G, and F_B can be set to remove band components in a high-frequency region of the separated images R_m, G_m, and B_m.

$$R\_p(x,y)=R\_m(x,y)*F\_R \quad (62)$$

$$G\_p(x,y)=G\_m(x,y)*F\_G \quad (63)$$

$$B\_p(x,y)=B\_m(x,y)*F\_B \quad (64)$$

In formulas (62) to (64), * indicates convolution.

The above-described pixel interpolation processing according to an exemplary embodiment is pixel interpolation processing having no correlation to respective red, green, and blue colors. However, another exemplary embodiment can perform pixel interpolation processing having correlation to red, green, and blue colors.

Hereinafter, an example digital filter usable for image interpolation is described. The following formula (65) expresses an example low-pass digital filter F_G.

$$F\_G=F'\_G/Sum\_F\_G \quad (65)$$

In formula (65), Sum F_G is a total value of F'_G coefficient. The following formula (66) expresses F'_G.

$$F'\_G = \frac{1}{2\pi\alpha\beta\sigma_x(I\_G)\sigma_y(I\_G)} \exp\left\{-\frac{1}{2}\left(\left(\frac{x}{\alpha\sigma_x(I\_G)}\right)^2 + \left(\frac{y}{\beta\sigma_y(I\_G)}\right)^2\right)\right\} \quad (66)$$

In formula (66), σx(I_G) and σy(I_G) are parameters indicating a spreading degree of the image interpolation digital filter, whose values change according to the area rate (area ratio) I_G of the RGB color filter defined by formula (30). Furthermore, in formula (66), α and β are constants (real numbers).

Figure 18:
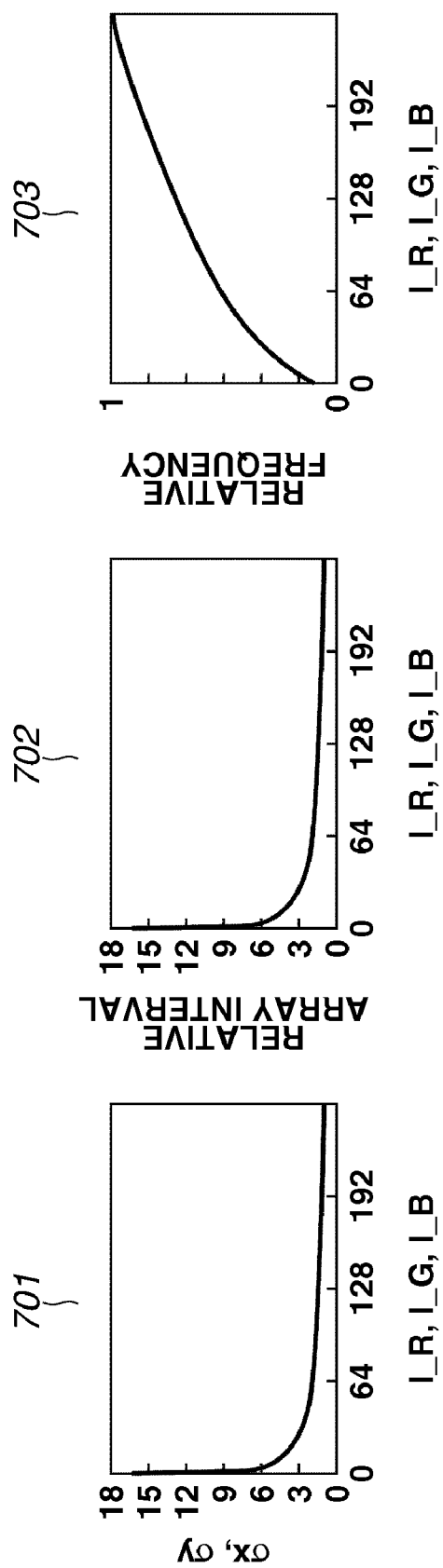
FIG. 18 illustrates example characteristics that change according to an area rate of a color filter.

According to an exemplary embodiment, σx and σy decrease when the color filter area rate I_R, I_G, or I_B increases as illustrated by 701 in FIG. 18 because the relative interval of color filter arrays decreases when the color filter area rate increases as illustrated by 702 in FIG. 18. Namely, if the color filter area rates I_R, I_G, and I_B increase, the color filters are densely arranged. Therefore, the pixel interpolation becomes feasible using digital filters having small spreading degrees σx and σy. In other words, as illustrated by 703 in FIG. 18, the relative frequency increases when the area rate I_R, I_G, or I_B increases. Therefore, the pixel interpolation becomes feasible using even a digital filter that has a small blur.

According to an exemplary embodiment, σx(I_G) and σy(I_G) are equal to the relative array interval. According to another exemplary embodiment, σx(I_G) and σy(I_G) can be different from the relative array interval.

FIG. 19 illustrates example image interpolation digital filters F_R (801), F_G (802), and F_B (803). According to an exemplary embodiment, the image interpolation digital filters 801 and 802 have a square size of 5×5 and the image interpolation digital filter 803 has a square size of 9×9. However, each image interpolation digital filter can be configured to have a rectangular size of 3×5, 5×7, or 5×9.

In FIG. 19, the spreading degree of image interpolation digital filters is in a relationship of F_B>F_R>F_G. This relationship reflects the above-described relationship of the color filter area rates I_R, I_G, and I_B, which are set to I_R=76, I_G=153, and I_B=26.

Figure 20:
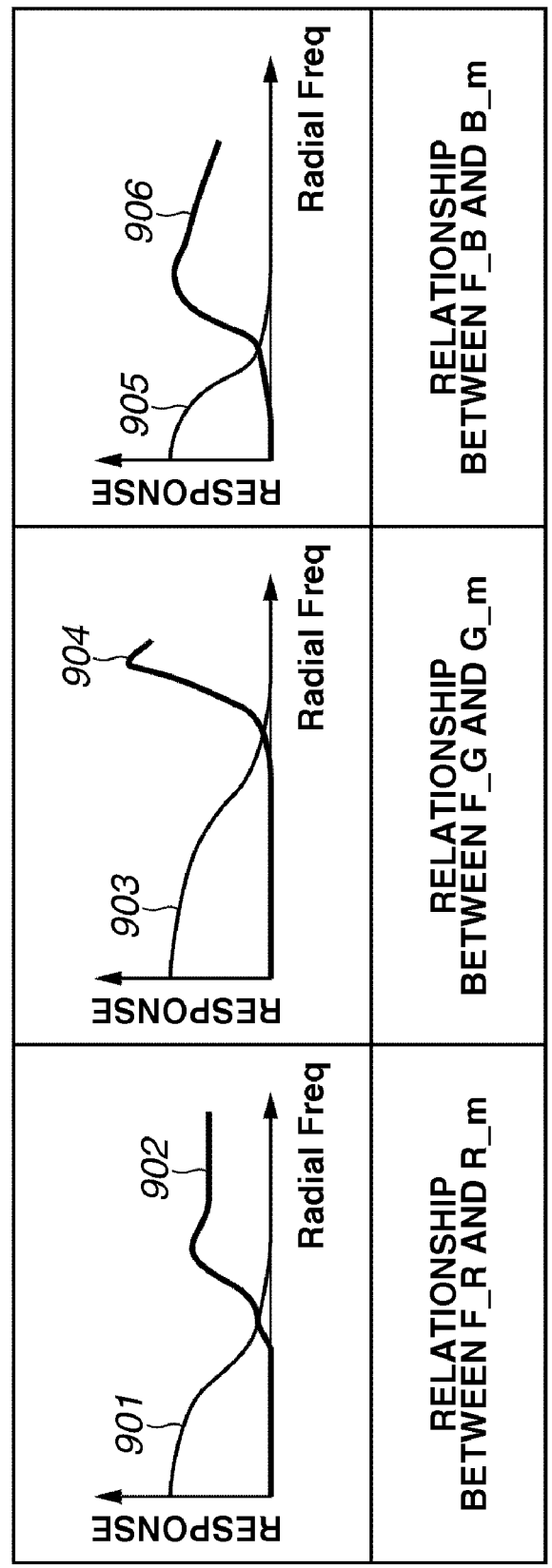
FIG. 20 illustrates an example relationship between an image interpolation digital filter and an area rate of a color filter in the frequency region.

FIG. 20 illustrates an example relationship between the image interpolation digital filter and the color filter area rate in the frequency region. In FIG. 20, a line 901 represents frequency characteristics of a red image interpolation digital filter F_R. A line 902 represents frequency characteristics of a red color filter array R_m. A line 903 represents frequency characteristics of a green image interpolation digital filter F_G. A line 904 represents frequency characteristics of a green color filter array G_m. A line 905 represents frequency characteristics of a blue image interpolation digital filter F_B. A line 906 represents frequency characteristics of a blue color filter array B_m.

In the frequency characteristics 906 of the blue separated image (color filter array) B_m, which has a lower area rate, a high-frequency band component shifts more toward a low-frequency region, compared to other color filters, according to the characteristics indicated by 703 in FIG. 18. If the pixel interpolation processing is performed without removing the high-frequency band component having shifted to the low-frequency region, the pixel interpolation processing generates noises. Therefore, compared to other pixel interpolating digital filters, the image interpolation digital filter F_B 905 has stronger attenuation characteristics (i.e., digital filter having a large blur) to remove a high-frequency band component.

On the other hand, in the frequency characteristics 904 of the green separated image (color filter array) G_m, which has a higher area rate, a high-frequency band component shifts more toward a high-frequency region, compared to other color filters. Therefore, compared to other pixel interpolating digital filters, the pixel interpolating digital filter F_G 903 has weaker attenuation characteristics (i.e., digital filter having a small blur) to remove a high-frequency band component.

As a digital filter having stronger attenuation characteristics is used in the blue pixel interpolation processing, the pixel interpolation-completed image B_p is a blurry image compared to other images R_p and G_p. However, no problem occurs because human eyes cannot easily recognize high-frequency components of a blurry image. As described above, if the interpolation parameters used in the pixel interpolation processing have frequency characteristics being set to remove high-frequency band components of a color filter array, an image including less noise can be obtained.

Figure 17:
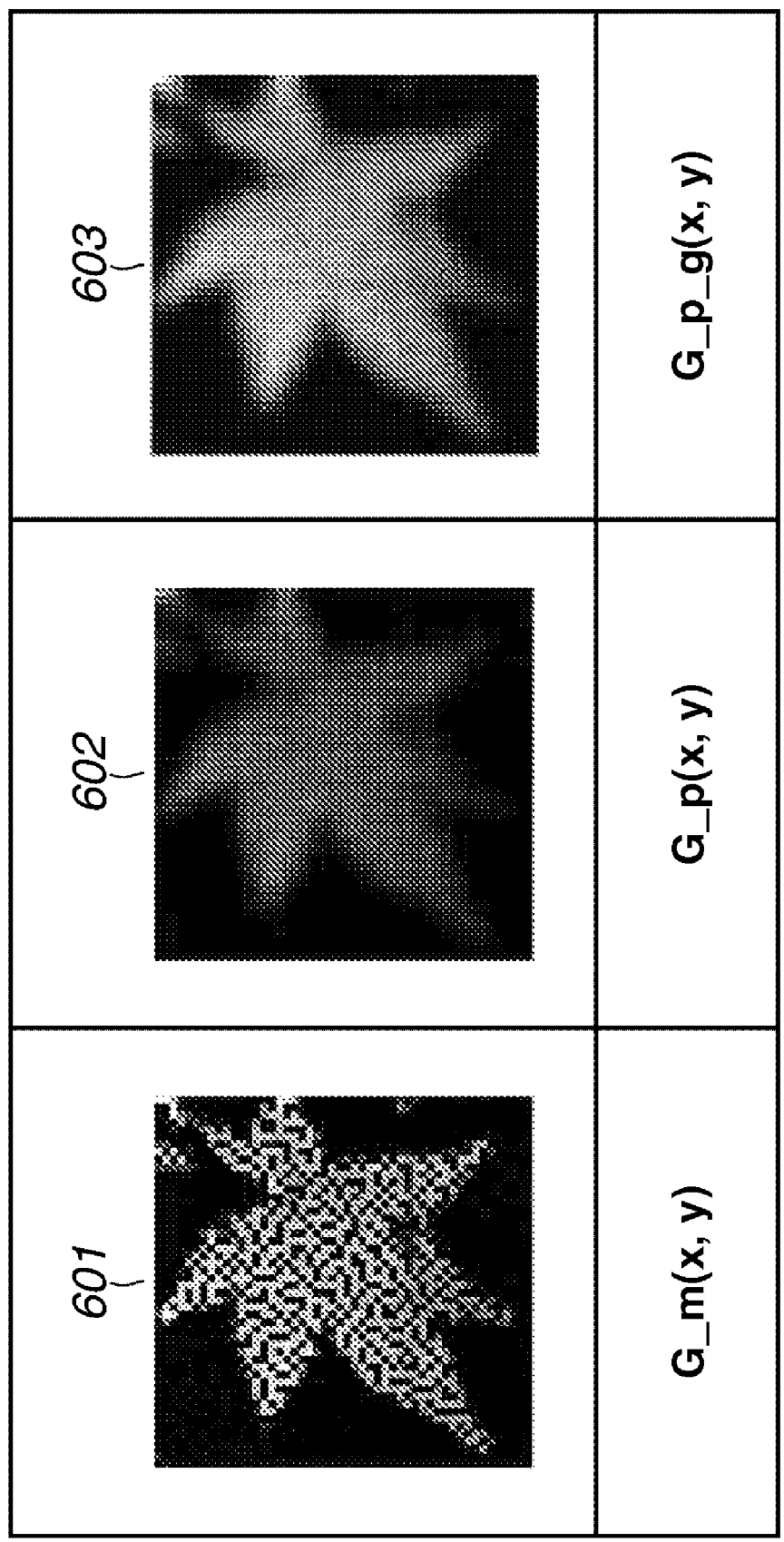
FIG. 17 illustrates example pixel interpolation processing.

In step S403, the pixel interpolation unit 103 performs gain processing according to the following formulas (67) through (70) (refer to 603 in FIG. 17).

$$R\_p\_g(x,y) = R\_p(x,y) \times \text{Gain}\_R \quad (67)$$

$$G\_p\_g(x,y) = G\_p(x,y) \times \text{Gain}\_G \quad (68)$$

$$B\_p\_g(x,y) = B\_p(x,y) \times \text{Gain}\_B \quad (69)$$

In formulas (67) to (69), $$\text{Gain}\_R = 255/I\_R$$

$$\text{Gain}\_G = 255/I\_G$$

$$\text{Gain}\_B = 255/I\_B \quad (70)$$

The gain processing is performed to adjust the luminance distribution of a captured image according to an object. The color filter area rates are I_R=76, I_G=153, and I_B=26. In FIG. 19, the sum of coefficients in the digital filters F_R, F_G, and F_B is equal to 1.0. Therefore, the luminance level of R_p, G_p, and B_p is 76/255, 153/255, and 26/255 relative to a target value. Thus, the gain processing is performed to adjust the luminance distribution to attain a target luminance.

Through the above-described processing, the color imaging apparatus 1 can complete the pixel interpolation processing performed in step S303 according to the third exemplary embodiment. Referring back to FIG. 15, in step S304, the color imaging apparatus 1 (the image processing unit 105) performs image processing on images of three independent planes obtained according to the above-described filter array. The image processing unit 105 performs gamma conversion, color processing, noise reduction processing, and sharpness improvement processing using the image processing parameters stored in the image processing parameter storage unit 106 and outputs image processing-completed images R_c, G_c, and B_c.

In step S305, the color imaging apparatus 1 temporarily stores the processed images R_c, G_c, and B_c in the memory unit 107. Finally, in step S306, the color imaging apparatus 1 causes the display unit 108 to display the images R_c, G_c, and B_c stored in the memory unit 107 and causes the data output unit 109 to transfer the images R_c, G_c, and B_c to an external storage device (not illustrated) or to a printer (not illustrated). Through the above-described processing, the color imaging apparatus 1 can entirely complete the operation.

As described above, an exemplary embodiment can reduce noise components of an image because the color filter array having no regularity, which is obtained using an error diffusion method, has spatial frequency characteristics has a reduced amount of low-frequency components.

Furthermore, since the spatial frequency characteristics include a band component in a high-frequency region, an exemplary embodiment realizes color image capturing capable of reducing generation of color moire even when an object has periodic changes in luminance without using an optical low-pass filter, or using a weak optical low-pass filter.

In an exemplary embodiment, the layout of R and G color filters is first determined and then the G color filter array is calculated from the determined RG color filter array. According to another exemplary embodiment, the order of determining the layout of R, G, and color filters can be different. According to an exemplary embodiment, the pixel interpolation unit 103 uses a single digital filter. According to another exemplary embodiment, the pixel interpolation unit 103 can use a digital filter that varies according to the array distribution of peripheral color filters or according to signal values in a peripheral mosaic pattern.

In an exemplary embodiment, the pixel interpolation unit 103 performs interpolation using a linear digital filter. According to another exemplary embodiment, the pixel interpolation unit 103 can perform interpolation using an interpolation function (0-order hold, bi-linear, spline, cubic convolution, etc.) based on non-0 mosaic pattern signal values in separated images R_m, G_m, and B_m.

Furthermore, to perform interpolation depending on information of the mosaic pattern signals of separated images R_m, G_m, and B_m, the pixel interpolation parameter storage unit 104 stores information identifying a pixel to be interpolated for the addresses of respective pixels.

When the pixel interpolation unit 103 performs interpolation using an interpolation function, luminance information of each color obtained through the interpolation is substantially the same as luminance information of an object. Therefore, the gain processing defined by formulas (67) through (70) is not performed.

According to another exemplary embodiment, the digital filter can be a nonlinear digital filter (a median filter taking a central value of a filter mask size, a filter taking a maximum value of a filter mask size, etc.). In an exemplary embodiment, the color image sensor unit is an RGB single plate type. According to another exemplary embodiment, the color image sensor unit can be a multiple-plate type. The above-described exemplary embodiment can be applied to a 3-color filter array of RGB colors, a 3-color filter array of Cy (cyan), Mg (magenta), and Ye (yellow) G, a 6-color filter array of RGB and Cy (cyan), Mg (magenta), Ye (yellow), or any other multi-color filter array.

Fourth Exemplary Embodiment

A fourth exemplary embodiment of the present invention is described below. The above-described third exemplary embodiment determines an RG array by using the error diffusion method and determines the remainder as a B filter array. Then, the third exemplary embodiment determines a G array from the RG array by using the error diffusion method and determines the remainder as an R array. Thus, the third exemplary embodiment can determine the arrays of RGB color filters without causing any overlap.

The fourth exemplary embodiment can generate color filter arrays not overlapped with each other in the order of GRB. Thus, similar to the third exemplary embodiment, the fourth exemplary embodiment can obtain a color filter array having a reduced amount of component in a low-frequency region and a band component in a high-frequency region.

Figure 21:
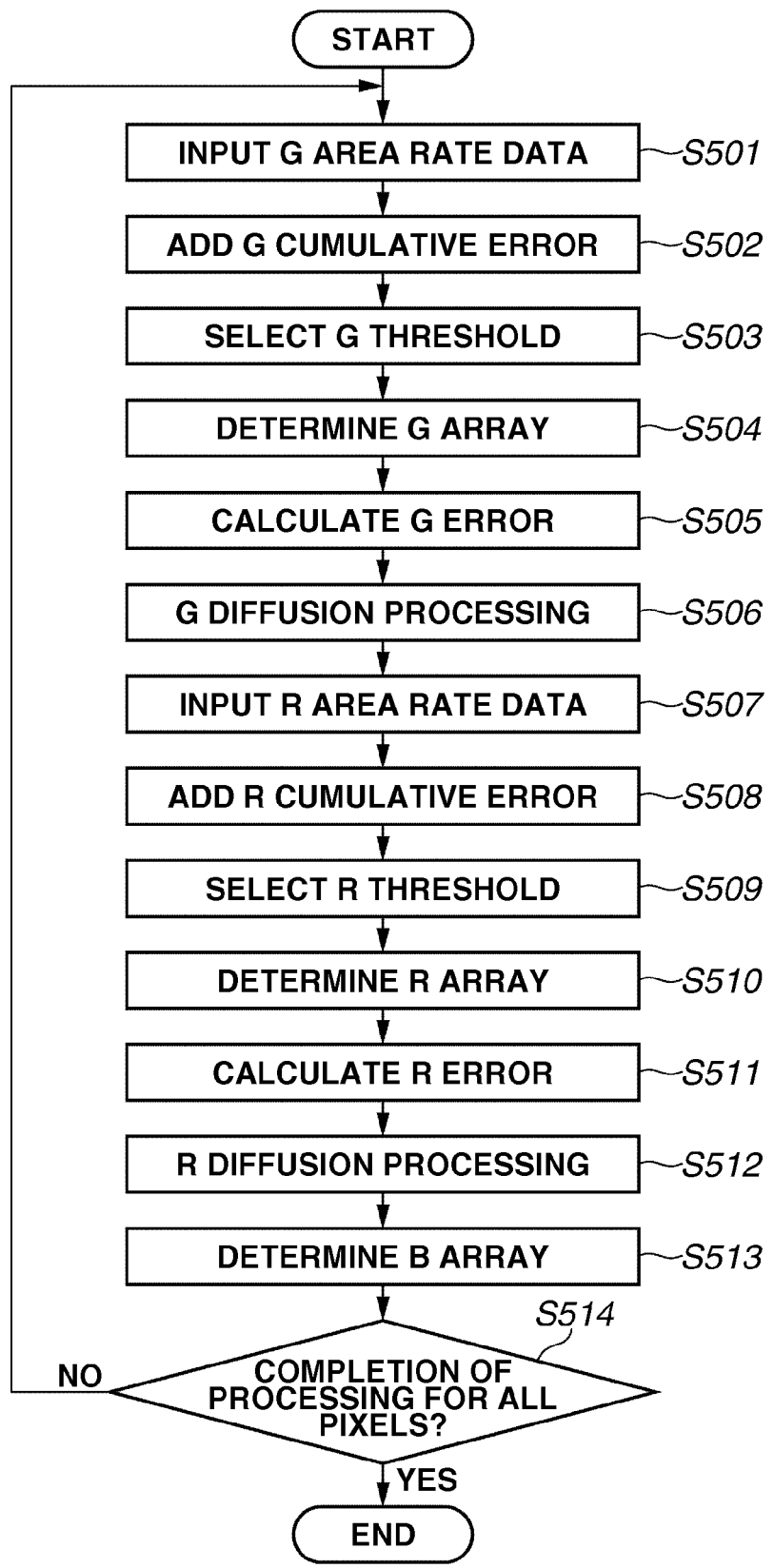
FIG. 21 is a flowchart illustrating example color filter array processing according to a fourth exemplary embodiment of the present invention.
Figure 22:
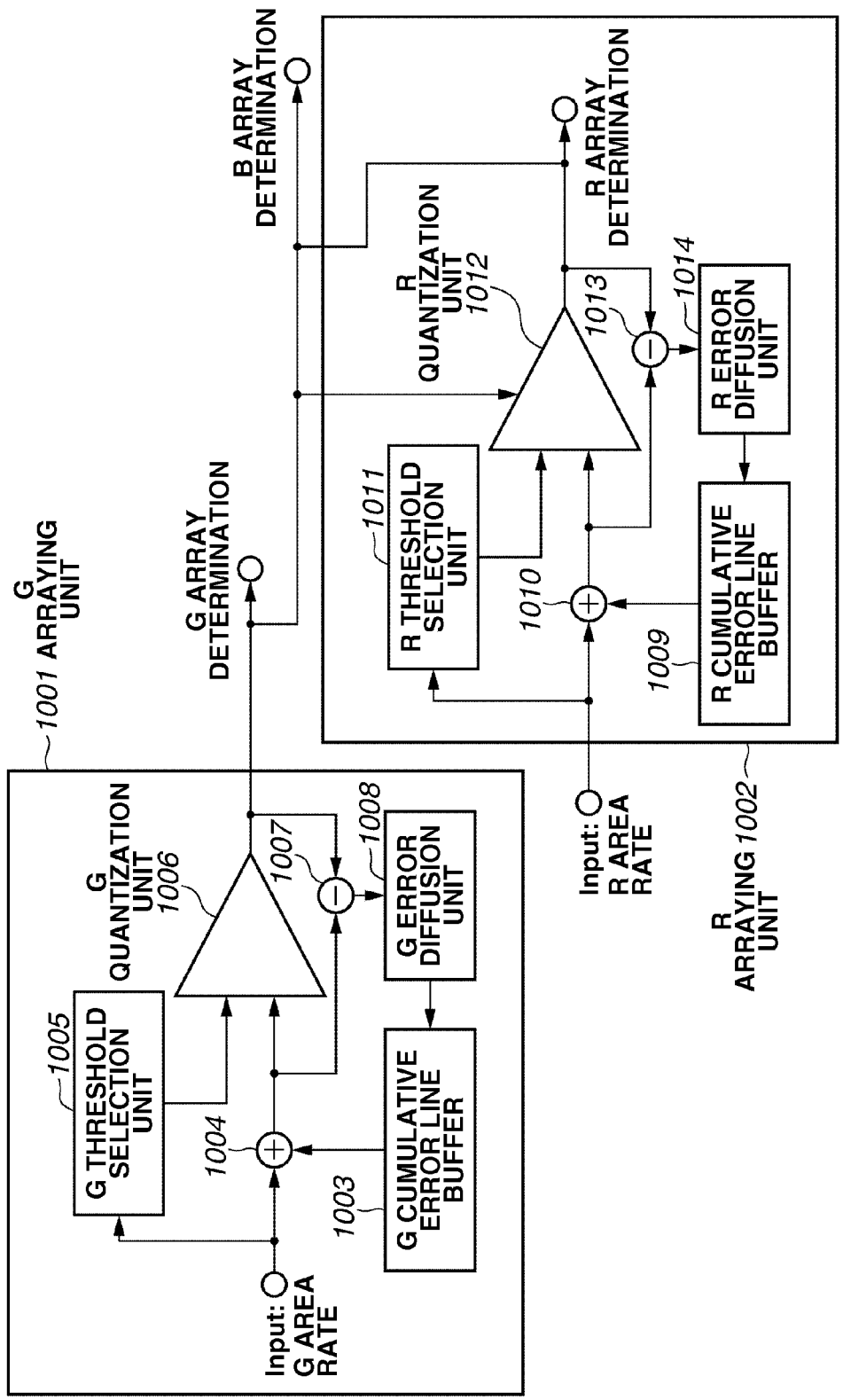
FIG. 22 is a block diagram illustrating an example circuit configured to determine a color filter array according to the fourth exemplary embodiment.

The fourth exemplary embodiment is similar to the third exemplary embodiment except for the color filter array processing (step S103). The color filter array processing according to this embodiment is described below with reference to a flowchart illustrated in FIG. 21 and a block diagram illustrated in FIG. 22. In this embodiment, each color image is an 8-bit image of 0 to 255.

In step S501, the control unit inputs G area rate data I_G into a G arraying unit 1001. An exemplary embodiment uses four error diffusion coefficients K1 through K4 illustrated in FIG. 12. The G arraying unit 1001 illustrated in FIG. 22 includes a G cumulative error line buffer 1003, which includes a storage area E_G0 and a plurality of storage areas E_G(x) ($0 \leq x \leq W-1$) equal in total number to the number W of horizontal pixels of the input image. The G cumulative error line buffer 1003 stores quantization errors according to a method described later. The G cumulative error line buffer 1003 can initialize all data into initial values 0 or any random values before starting the processing. FIG. 23 illustrates detailed storage areas 1003 of the G cumulative error line buffer 1003.

In step S502, the control unit (G cumulative error adding unit 1004) adds an error E_G(x) corresponding to the horizontal pixel position x of the G area rate data to the input target pixel (G area rate data) I_G. The following formula (71) defines I_G' representing cumulative error-added data, which can be calculated based on the input target pixel (G area rate data) I_G.

$$I\_G' = I\_G + E\_G(x) \quad (71)$$

In step S503, the control unit (G threshold selection unit 1005) selects a threshold T_G. In this case, an exemplary embodiment satisfies the following relationship.

$$t\_G = I\_G \quad (72)$$

The following formula (73) expresses the threshold T_G.

$$T\_G(t\_G) = 128 \quad (73)$$

$(0 \leq t\_G \leq 255)$

To eliminate any delay in array generation, the threshold T_G can be finely changed according to t_G to decrease an averaged quantization error.

In step S504, the control unit (G quantization unit 1006) compares the error-added G area rate data I_G' with the threshold T(t_G) and determines an output value Out_G (quantized value 0 or 1) according to the following formulas (74) through (77).

$$\text{If } I\_G' < T\_G \quad (74)$$

$$\text{Out\_G} = 0 \quad (75)$$

$$\text{If } I\_G' \leq T\_G \quad (76)$$

$$\text{Out\_G} = 1 \quad (77)$$

In step S505, the control unit (G error calculation unit 1007) calculates a difference Err_G between the pixel data I_G' and the output value Out_G according to the following formula (78).

$$\text{Err}\_G(x) = I\_G' - (\text{Out}\_G \times 255) \quad (78)$$

In step S506, the control unit (G error diffusion unit 1008) diffuses the error Err_G(x) according to the horizontal pixel position x in the following manner. The direction of the processing performed by the G error diffusion unit 1008 varies depending on the vertical address of a pixel to be processed. For example, if the vertical address (y(0≤y≤H−1)) is dividable by 2, the G error diffusion unit 1008 performs the processing from left to right as indicated by 401 of FIG. 12 and diffuses the error according to the following formula (79). On the other hand, if the vertical address (y(0≤y≤H−1)) is not dividable by 2, the G error diffusion unit 1008 performs the processing from right to left as indicated by 402 of FIG. 12 and diffuses the error according to the following formula (80).

If y % 2=0 (0≤y≤H−1 and % is a residue mark), $$E\_G(x+1) \leftarrow E\_G(x+1) + \text{Err}\_G(x) \times K1(x<W-1)$$

$$E\_G(x-1) \leftarrow E\_G(x-1) + \text{Err}\_G(x) \times K2(x>0)$$

$$E\_G(x) \leftarrow E0\_G + \text{Err}\_G(x) \times K3$$

$$E0\_G \leftarrow E\_G \times K4(x<W-1)$$

$$E0\_G \leftarrow 0(x=W-1) \quad (79)$$

If y % 2=1 (0≤y≤H and % is a residue mark), $$E\_G(x-1) \leftarrow E\_G(x-1) + \text{Err}\_G(x) \times K1(x>0)$$

$$E\_G(x+1) \leftarrow E\_G(x+1) + \text{Err}\_G(x) \times K2(x<W-1)$$

$$E\_G(x) \leftarrow E0\_G + \text{Err}\_G(x) \times K3$$

$$E0\_G \leftarrow E\_G \times K4(x>0)$$

$$E0\_G \leftarrow 0(x=0) \quad (80)$$

According to an exemplary embodiment, the coefficients K1 through K4 are set to K1=7/16, K2=3/16, K3=5/16, and K4=1/16 although the coefficients K1 through K4 can be changed according to t_G. Through the above-described processing, determination of the array Out_G (quantized value 0 or 1) for the G area rate data I_G for one pixel is accomplished. Next, the control unit performs error diffusion processing on R area rate data I_R to determine the array.

In step S507, the control unit inputs the R area rate data I_R to the R arraying unit 1002. If an exemplary embodiment uses four error diffusion coefficients K1 through K4 illustrated in FIG. 12, an R cumulative error line buffer 1009 of the R arraying unit 1002 illustrated in FIG. 11 includes a storage area E R0 and a plurality of storage areas E_R(x) (x=0 to W−1) equal in total number to the number W of the horizontal pixels of the input image. The R cumulative error line buffer 1009 stores quantization errors according to a method described later. The R cumulative error line buffer 1009 can initialize all data into initial values 0 or any random values before starting the processing. FIG. 23 illustrates detailed storage areas 1009 of the R cumulative error line buffer 1009.

In step S508, the control unit (R cumulative error adding unit 1010) adds an error E_R(x) corresponding to the horizontal pixel position x of the R area rate data to the input R area rate data. The following formula (81) defines I_R' representing cumulative error-added data, which can be calculated based on the input target pixel (R area rate data) I_R.

$$I\_R' = I\_R + E\_R(x) \quad (81)$$

In step S509, the control unit (R threshold selection unit 1011) selects a threshold T_R. In this case, an exemplary embodiment satisfies the following relationship.

$$t\_G = I\_R \quad (82)$$

The following formula (83) expresses the threshold T_R.

$$T\_R(t\_R) = 128 \quad (83)$$

$(0 \leq t\_R \leq 255)$

To eliminate any delay in array generation, the threshold T_R can be finely changed according to t_R to reduce an averaged quantization error.

In step S510, the control unit (R quantization unit 1012) compares the error-added R area rate data I_R' with the threshold T_R and the output value Out_G, and determines a finalized R filter array result Out_R according to the following rules.

$$\text{If Out\_G} = 0 \text{ and } I\_R' \geq T\_R, \quad (84)$$

$$\text{Out\_R} = 1 \quad (85)$$

And, if the relationship (84) is not satisfied, (86)

$$\text{Out\_R} = 0 \quad (87)$$

In step S511, the control unit (R error calculation unit 1013) calculates a difference Err_R between the error-added R area rate data I_R' and the output value Out_R according to the following formula (88).

$$\mathrm{Err\_R}(x) = I\_R' - (\mathrm{Out\_R} \times 255) \tag{88}$$

In step S512, the control unit (R error diffusion unit 1014) diffuses an error Err_R(x) according to the horizontal pixel position x in the following manner. Similar to the G error diffusion unit 1008, the R error diffusion unit 1014 changes the processing direction according to the vertical address of the processing pixel. For example, if the vertical address y (0≦y≦H−1) is dividable by 2, the control unit performs the processing from left to right as indicated by 401 in FIG. 12 and diffuses the error according to the following formula (89). On the other hand, if the vertical address y (0≦y≦H−1) is not dividable by 2, the control unit performs the processing from right to left as indicated by 402 in FIG. 12 and diffuses the error according to the following formula (90).

If y % 2=0 (0≦y≦H−1 and % is a residue mark), $$E\_R(x+1) \leftarrow E\_R(x+1) + \mathrm{Err\_R}(x) \times K1 \, (x<W-1)$$

$$E\_R(x-1) \leftarrow E\_R(x-1) + \mathrm{Err\_R}(x) \times K2 \, (x>0)$$

$$E\_R(x) \leftarrow E0\_R + \mathrm{Err\_R}(x) \times K3$$

$$E0\_R \leftarrow E\_R \times K4 \, (x<W-1)$$

$$E0\_R \leftarrow 0 \, (x=W-1) \tag{89}$$

If y % 2=1 (0≦y≦H and % is a residue mark), $$E\_R(x-1) \leftarrow E\_R(x-1) + \mathrm{Err\_R}(x) \times K1 \, (x>0)$$

$$E\_R(x+1) \leftarrow E\_R(x+1) + \mathrm{Err\_R}(x) \times K2 \, (x<W-1)$$

$$E\_R(x) \leftarrow E0\_R + \mathrm{Err\_R}(x) \times K3$$

$$E0\_R \leftarrow E\_R \times K4 \, (x>0)$$

$$E0\_R \leftarrow 0 \, (x=0) \tag{90}$$

According to an exemplary embodiment, the coefficients K1 through K4 are set to K1=7/16, K2=3/16, K3=5/16, and K4=1/16 although the coefficients K1 through K4 can be changed according to the input gradation value t_R. Through the above-described processing, determination of the array Out_R (quantized value 0 or 1) for the R filter for one pixel is accomplished.

In step S513, the control unit determines an array Out_B as a portion where neither of Out_G and Out_R is 1 according to the following formula.

If Out G=0 and Out_R=0, (91)

Out_B=1 (92)

And, if the relationship (91) is not satisfied, (93)

Out_B=0 (94)

In step S514, the control unit determines whether the above-described processing has been completed for all pixels. If the control unit determines that the processing has been completed for all pixels (YES in step S514), the control unit terminates the color filter array processing (i.e., processing in step S103).

The purpose of determining the above-described G filter array is to prioritize the G filter array over other filter arrays. Namely, an exemplary embodiment ensures an appropriate array for the G filter array having a reduced amount of low-frequency components. Next, the result of an R filter array is fixed. Finally, the layout of a B filter is fixed. However, as the R and B filters have been subjected to error diffusion processing, both the R and B filters have characteristics having a reduced amount of component in a low-frequency region and a band component in a high-frequency region.

According to the above-described embodiment, the G color filter array is prioritized. However, according to another exemplary embodiment, any other color filter array can be prioritized. As a result, an exemplary embodiment can realize appropriate characteristics for the RGB color filter arrays, so that each color filter array has sufficient high-frequency components and a reduced amount of low-frequency components. Furthermore, an exemplary embodiment can greatly reduce low-frequency components of a prioritized color filter compared to low-frequency components of other color filters.

Fifth Exemplary Embodiment

According to the fourth exemplary embodiment, color filter arrays are generated in the order of GRB using the error diffusion method. Thus, similar to the third exemplary embodiment, the fourth exemplary embodiment can obtain color filter arrays that have a reduced amount of component in a low-frequency region and a band component in a high-frequency region. Furthermore, the color filter arrays are not overlapped with each other.

However, according to the processing in the fourth exemplary embodiment, the G filter and the R filter may be positioned closely. Both the G filter and the R filter have a large ratio in constituting luminance information relative to the B filter. Therefore, resolution (sharpness) deteriorates if the G filter and the R filter are positioned closely.

Although the fifth exemplary embodiment performs processing similar to that of the fourth exemplary embodiment, the fifth exemplary embodiment determines a G filter array and an R filter array so as not to be arranged closely. Therefore, the fifth embodiment can improve resolution (sharpness).

Figure 24:
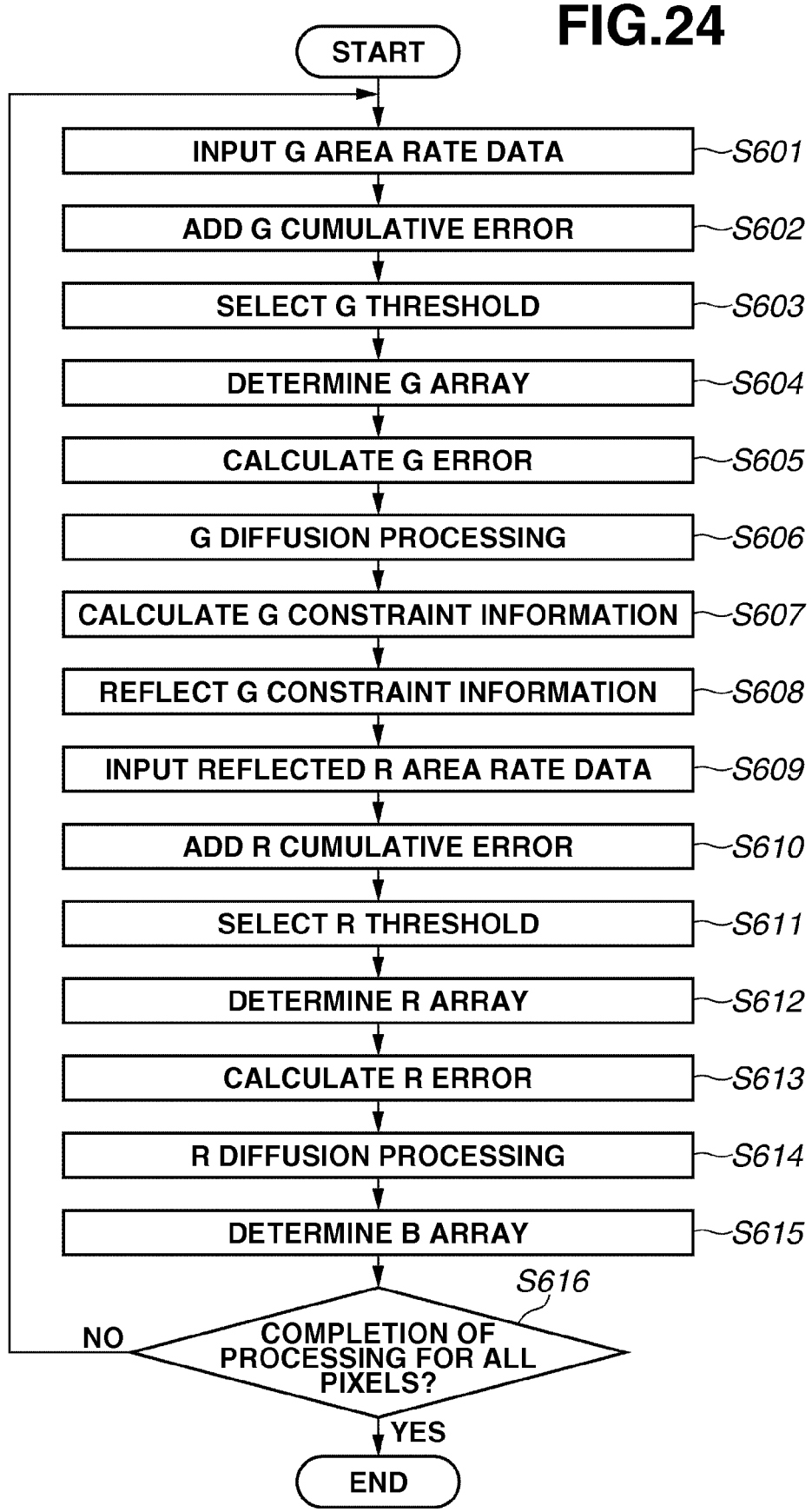
FIG. 24 is a flowchart illustrating example color filter array processing according to a fifth exemplary embodiment of the present invention.

The fifth exemplary embodiment is similar to the third and fourth exemplary embodiments except for the color filter array processing (step S103). The color filter array processing (step S103) according to this embodiment is described below with reference to a flowchart illustrated in FIG. 24 and a block diagram illustrated in FIG. 25. In this embodiment, each color image is an 8-bit image of 0 to 255.

Figure 25:
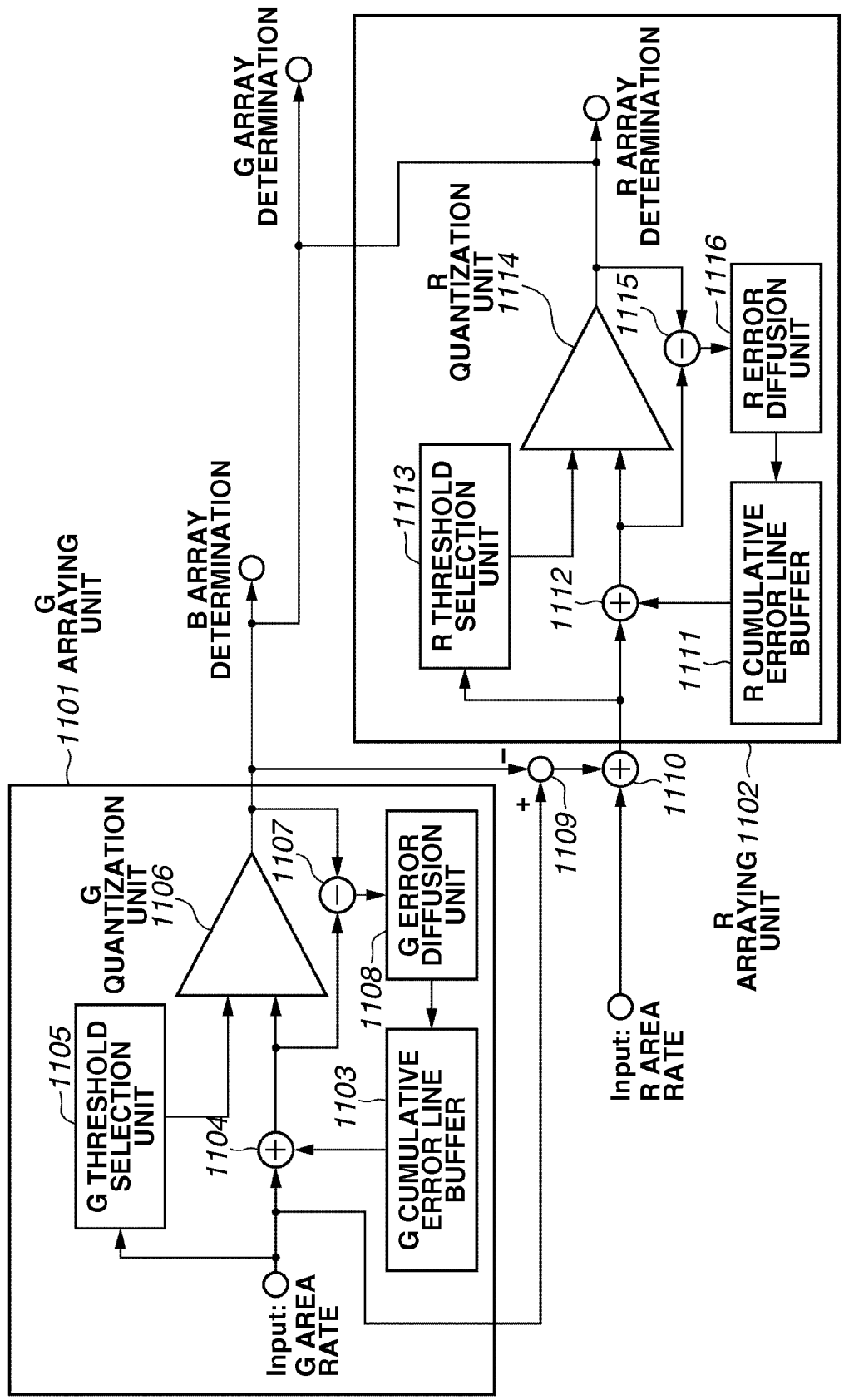
FIG. 25 is a block diagram illustrating an example circuit configured to determine a color filter array according to the fifth exemplary embodiment.

In step S601, the control unit inputs G area rate data I_G into a G arraying unit 1101 illustrated in FIG. 25. If an exemplary embodiment uses four error diffusion coefficients K1 through K4 illustrated in FIG. 12, a G cumulative error line buffer 1103 of the G arraying unit 1101 includes a storage area E_G0 and a plurality of storage areas E_G(x) (0≦x≦W−1) equal in total number to the number W of horizontal pixels of the input image. The G cumulative error line buffer 1103 stores quantization errors according to a method described later. The G cumulative error line buffer 1103 can initialize all data into initial values 0 or any random values before starting the processing. FIG. 26 illustrates detailed storage areas 1103 of the G cumulative error line buffer 1103.

In step S602, the control unit (G cumulative error adding unit 1104) adds, to the G area rate data, an error E_G(x) corresponding to the horizontal pixel position x of the G area rate data. More specifically, the following formula (95) defines I_G' representing cumulative error-added data, which can be calculated based on the input target pixel (G area rate data) I_G.

$$I\_G' = I\_G + E\_G(x) \tag{95}$$

In step S603, the control unit (G threshold selection unit 1105) selects a threshold T_G. In this case, an exemplary embodiment satisfies the following relationship.

$$t\_G = I\_G \quad (96)$$

The following formula (97) expresses the threshold T_G.

$$T\_G(t\_G) = 128 \quad (97)$$

$(0 \leq t\_G \leq 255)$

To eliminate any delay in array generation, the threshold T_G can be finely changed according to t_G to reduce an averaged quantization error.

In step S604, the control unit (G quantization unit 1106) compares the error-added G area rate data I_G' with the threshold T_G and determines an output value Out_G using formulas (98) through (101) according to the following rules.

$$\text{If } I\_G' < T\_G, \quad (98)$$

$$\text{Out\_G} = 0 \quad (99)$$

$$\text{And, if } I\_G' \geq T\_G, \quad (100)$$

$$\text{Out\_G} = 1 \quad (101)$$

In step S605, the control unit (G error calculation unit 1107) calculates a difference Err_G between the pixel data I_G' and the output value Out_G according to the following formula (102).

$$\text{Err}\_G(x) = I\_G' - (\text{Out}\_G \times 255) \quad (102)$$

In step S606, the control unit (G error diffusion unit 1108) diffuses the error Err_G(x) according to the horizontal pixel position x in the following manner. The direction of the processing performed by the G error diffusion unit 1108 varies depending on the vertical address of a pixel to be processed. For example, if the vertical address (y $(0 \leq y \leq H-1)$) is dividable by 2, the G error diffusion unit 1108 performs the processing from left to right as indicated by 401 in FIG. 12 and diffuses the error according to the following formula (103). On the other hand, if the vertical address (y $(0 \leq y \leq H-1)$) is not dividable by 2, the G error diffusion unit 1108 performs the processing from right to left as indicated by 402 of FIG. 12 and diffuses the error according to the formula (104).

If y % 2=0 $(0 \leq y \leq H-1$ and % is a residue mark), $$E\_G(x+1) \leftarrow E\_G(x+1) + \text{Err}\_G(x) \times K1 (x < W-1)$$

$$E\_G(x-1) \leftarrow E\_G(x-1) + \text{Err}\_G(x) \times K2 (x > 0)$$

$$E\_G(x) \leftarrow E0\_G + \text{Err}\_G(x) \times K3$$

$$E0\_G \leftarrow E\_G \times K4 (x < W-1)$$

$$E0\_G \leftarrow 0 (X = W-1) \quad (103)$$

If y % 2=1 $(0 \leq y \leq H$ and % is a residue mark), $$E\_G(x-1) \leftarrow E\_G(x-1) + \text{Err}\_G(x) \times K1 (x > 0)$$

$$E\_G(x+1) \leftarrow E\_G(x+1) + \text{Err}\_G(x) \times K2 (x < W-1)$$

$$E\_G(x) \leftarrow E0\_G + \text{Err}\_G(x) \times K3$$

$$E0\_G \leftarrow E\_G \times K4 (x > 0)$$

$$E0\_G \leftarrow 0 (x = 0) \quad (104)$$

According to an exemplary embodiment, the coefficients K1 through K4 are set to K1=7/16, K2=3/16, K3=5/16, and K4=1/16 although the coefficients K1 through K4 can be changed according to t_G. Through the above-described processing, determination of the array Out_G (quantized value 0 or 1) for the G area rate data I_G for one pixel is accomplished.

In step 607, the control unit (G constraint information data calculation unit 1109) calculates constraint information according to the following formula (105).

$$C\_G = (-\text{Out}\_G \times 255 + I\_G) \times h \quad (105)$$

In formula (105), "h" is a constant (real number), which can be set to 1.0 according to an exemplary embodiment.

In step S608, the control unit (G constraint information reflecting unit 1110) reflects the constraint information data to I_R. This constraint information reflection processing generates an R filter array positioned far from the G filter, which has been already formed.

$$I\_R\_r = I\_R + C\_G \quad (106)$$

In step S609, the control unit performs error diffusion processing on the reflected R area rate data I_R_r to determine the array. First, the control unit inputs the reflected R area rate data I_R_r into an R arraying unit 1102. If an exemplary embodiment uses four error diffusion coefficients K1 through K4 illustrated in FIG. 12, the R arraying unit 1102 illustrated in FIG. 25 includes an R cumulative error line buffer 1111 that includes a storage area E_R0 and a plurality of storage areas E_R(x) (x=0 to W-1) equal in total number to the number W of horizontal pixels of the input image. The R cumulative error line buffer 1111 stores quantization errors according to a method described later. The R cumulative error line buffer 1111 can initialize all data into initial values 0 or any random values before starting the processing. FIG. 26 illustrates detailed storage areas 1111 of the R cumulative error line buffer 1111.

In step S610, an R cumulative error adding unit 1112 adds, to the input R area rate data, an error E_R(x) corresponding to the horizontal pixel position x of the input R area rate data. More specifically, the following formula (107) defines I_R' representing cumulative error-added data, which can be calculated based on the input target pixel (R area rate data).

$$I\_R' = I\_R\_r + E\_R(x) \quad (107)$$

In step S611, the control unit (R threshold selection unit 1113) selects a threshold T_R. In this case, an exemplary embodiment satisfies the following relationship.

$$t\_R = I\_R \quad (108)$$

The following formula (109) expresses the threshold T_R.

$$T\_R(t\_R) = 128 \quad (109)$$

$(0 \leq t\_R \leq 255)$

In this case, to eliminate any delay in array generation, the threshold T_R can be finely changed according to t_R to reduce an averaged quantization error.

In step S612, the control unit (R quantization unit 1114) compares the error-added R area rate data I_R' with the threshold T_R and determines a finalized R filter array result Out_R according to the following formulas (110) through (113).

$$\text{If } I\_R' \geq T\_R, \quad (110)$$

$$\text{Out\_R} = 1 \quad (111)$$

$$\text{And, if } I\_R' < T\_R, \quad (112)$$

$$\text{Out\_R} = 0 \quad (113)$$

In step S613, the control unit (R error calculation unit 1115) calculates a difference Err_R between the R area rate data I_R' and the output value Out_R according to the following formula (114).

$$\text{Err}\_R(x) = I\_R' - (\text{Out}\_R \times 255) \tag{114}$$

In step S614, the control unit (R error diffusion unit 1116) diffuses the error Err_R(x) according to the horizontal pixel position x in the following manner. The direction of the processing performed by the R error diffusion unit 1116 varies depending on the vertical address of a pixel to be processed. For example, if the vertical address (y ($0 \leq y \leq H-1$)) is dividable by 2, the R error diffusion unit 1116 performs the processing from left to right as indicated by 401 in FIG. 12 and diffuses the error according to the following formula (115). On the other hand, if the vertical address (y ($0 \leq y \leq H-1$)) is not dividable by 2, the R error diffusion unit 1116 performs the processing from right to left as indicated by 402 in FIG. 12 and diffuses the error according to the following formula (116).

If y % 2=0 ($0 \leq y \leq H-1$ and % is a residue mark), $$E\_R(x+1) \leftarrow E\_R(x+1) + \text{Err}\_R(x) \times K1 \,(x < W-1)$$

$$E\_R(x-1) \leftarrow E\_R(x-1) + \text{Err}\_R(x) \times K2 \,(x > 0)$$

$$E\_R(x) \leftarrow E0\_R + \text{Err}\_R(x) \times K3$$

$$E0\_R \leftarrow E\_R \times K4 \,(x < W-1)$$

$$E0\_R \leftarrow 0 \,(X = W-1) \tag{115}$$

If y % 2=1 ($0 \leq y \leq H$ and % is a residue mark), $$E\_R(x-1) \leftarrow E\_R(x-1) + \text{Err}\_R(x) \times K1 \,(x > 0)$$

$$E\_R(x+1) \leftarrow E\_R(x+1) + \text{Err}\_R(x) \times K2 \,(x < W-1)$$

$$E\_R(x) \leftarrow E0\_R + \text{Err}\_R(x) \times K3$$

$$E0\_R \leftarrow E\_R \times K4 \,(x > 0)$$

$$E0\_R \leftarrow 0 \,(x = 0) \tag{116}$$

According to an exemplary embodiment, the coefficients K1 through K4 are set to K1=7/16, K2=3/16, K3=5/16, and K4=1/16 although the coefficients K1 through K4 can be changed according to the input gradation value t_R. Through the above-described processing, determination of the array Out_R (quantized value 0 or 1) for the R filter for one pixel is accomplished.

In step S615, the control unit determines an array Out_B as a portion where neither of Out_G and Out_R is 1 according to the following formulas.

If Out_G=0 and Out_R=0, (117)

Out_B=1 (118)

And, if the relationship (117) is not satisfied, (119)

Out_B=0 (120)

In step S616, the control unit determines whether the above-described processing has been accomplished for all pixels. If the control unit determines that the above-described processing has been accomplished for all pixels (YES in step S616), the control unit terminates the color filter array processing (step S103).

The purpose of determining the above-described array of the G filter is to prioritize the array of the G filter. Namely, an exemplary embodiment can ensure a G filter array capable of greatly reducing low-frequency components. The embodiment determines an R filter array considering the determined G filter array. As a result, the embodiment can prevent the G filter and the R filter from being positioned closely and, as a result, can improve resolution (sharpness).

Sixth Exemplary Embodiment

A sixth exemplary embodiment of the present invention is described below. According to the above-described second to fifth exemplary embodiments, the error diffusion method is used to determine a color filter array. The sixth exemplary embodiment does not use the error diffusion method and, instead, uses a method for minimizing an evaluation function such that the color filter array has a reduced amount of component in a low-frequency region and a band component in a high-frequency region. Thus, similar to third exemplary embodiment, the sixth exemplary embodiment can realize a color filter array that has a reduced amount of component in a low-frequency region and a band component in a high-frequency region.

According to an exemplary embodiment, a genetic algorithm can be used to minimize the evaluation function such that the color filter array has a reduced amount of component in a low-frequency region and a band component in a high-frequency region. According to another exemplary embodiment, a threshold matrix generation method can be used.

The processing according to the sixth exemplary embodiment is similar to that in the third exemplary embodiment and different in the color filter array processing (step S103). Example color filter array processing (step S103) according to this embodiment is described below with reference to a flowchart illustrated in FIG. 27 and a block diagram illustrated in FIG. 28.

Similar to the third exemplary embodiment, the determination order of the RGB color filters according to the sixth exemplary embodiment is "RG array→ remainder=B→determination of G→remainder=R." According to another exemplary embodiment, the determination order can be the one described in the fourth and fifth exemplary embodiments.

In step S701, the control unit inputs RGB area rate total data I_RGB into an RGB summing unit 1201. The RGB area rate total data represents the sum (=255) of formulas (29), (30), and (31).

$$I\_RGB = I\_R + I\_G + I\_B \tag{121}$$

In step S702, the control unit inputs RG area rate total data I_RG into an RG arraying unit 1202.

$$I\_RG = I\_R + I\_G \tag{122}$$

In step S703, the control unit (RG array evaluation parameter setting unit 1204) sets an evaluation parameter. The evaluation parameter is used to determine spatial frequency characteristics of a color filter array.

For example, the Gauss characteristics Low-Pass Filter (hereinafter, referred to as Gauss LPF): Gs_RG (f) having a cutoff frequency f_cutoff_RG can be used in evaluating frequency characteristics of an RG filter array. In this case, f_cutoff_RG(I_RG) and Gauss LPF: Gs_RG(f) are in a relationship expressed by the following formula (123) when N(μ, σ²) represents a Gauss distribution density function defined by average μ and dispersion σ².

$$Gs\_RG(f) = \quad (123)$$

$$\sqrt{2\pi} \frac{f\_cutoff\_RG(I\_RG)}{a} \cdot N\left(0, \left(\frac{f\_cutoff\_RG(I\_RG)}{a}\right)^2\right)$$

f: frequency (radian)
I_RG: area rate of RG filter (0≦I_RG≦255)

In formula (123), "a" is a parameter indicating the spreading of Gauss characteristics, and f_cutoff_RG(I_RG) represents the cutoff frequency of Gs_RG(f). If a=3, Gs_RG (I_RG) attenuates at f=f_cutoff_RG(I_RG). If a=1, Gs_RG (f) does not attenuate at f=f_cutoff_RG(I_RG). In this manner, Gauss LPF: Gs_RG(f) changes differently depending on the parameter "a." Therefore, the parameter "a" is one of parameters that determine an evaluation Gauss LPF.

The evaluation can be performed without using the Gauss LPF. For example, the Gauss LPF can be replaced with a rectangular low-pass filter. If a rectangular low-pass filter is used, an ideal cutoff frequency can be used as a parameter. The frequency characteristics of a color filter array to be reproduced vary depending on a selected parameter. An example in the case of a=3 in Gs_RG(f) is described below.

Figure 29:
FIG. 29 illustrates an example random array.
Figure 30:
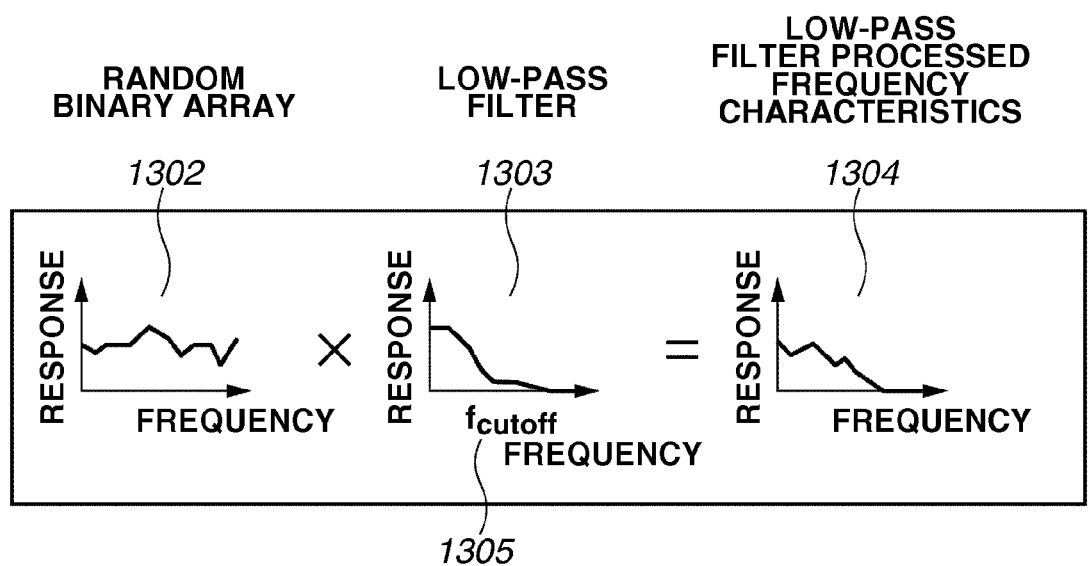
FIG. 30 illustrates frequency characteristics obtained when a Gauss low-pass filter (LPF) is applied to the random array illustrated in FIG. 29.

FIG. 29 illustrates a random array 1301 corresponding to I_RG=80 of RG area rate total data I_RG (8-bit, 0≦I_RG≦255). FIG. 30 illustrates a frequency spectrum 1302 of the random array 1301, an evaluation Gauss LPF 1303, a product 1304 of the frequency spectrum 1302 and the evaluation Gauss LPF 1303, and a cutoff frequency f_cutoff_RG(I_RG) 1305 of the Gauss LPF 1303. The frequency spectrum 1302 illustrated in FIG. 30 has low-frequency components. The product 1304 is a spectrum having low-frequency components.

The human vision is "sensitive to low-frequency components and insensitive to high-frequency components." Therefore, to determine a color filter array excellent in visual effects, it is desired that a spectrum does not have low-frequency components. Namely, the random array 1301 is not a desired color filter array because of its spectrum having low-frequency components. Hence, a color filter array bringing better visual effects can be determined by editing the color filter array so as to have no spectrum in the product 1304. An example editing method is described later.

Figure 31:
FIG. 31 illustrates an example color filter array.
Figure 32:
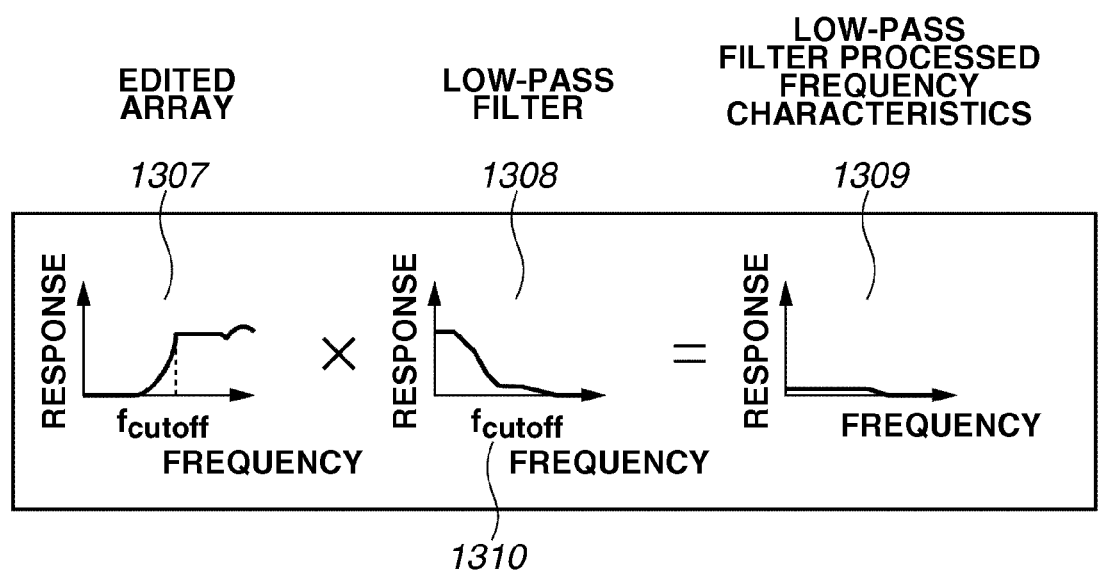
FIG. 32 illustrates frequency characteristics obtained when a Gauss LPF is applied to the color filter array illustrated in FIG. 31.

FIG. 31 illustrates an example color filter array 1306 corresponding to area rate=80 that brings better visual effects. FIG. 32 illustrates a frequency spectrum 1307 of the color filter array 1306, a Gauss LPF 1308, a product 1309 of the frequency spectrum 1307 and the Gauss LPF 1308, and a cutoff frequency 1310 of the Gauss LPF 1308. It is apparent that the color filter array bringing better visual effects has a small spectrum when the frequency spectrum 1307 is multiplied by the Gauss LPF 1308.

Figure 33:
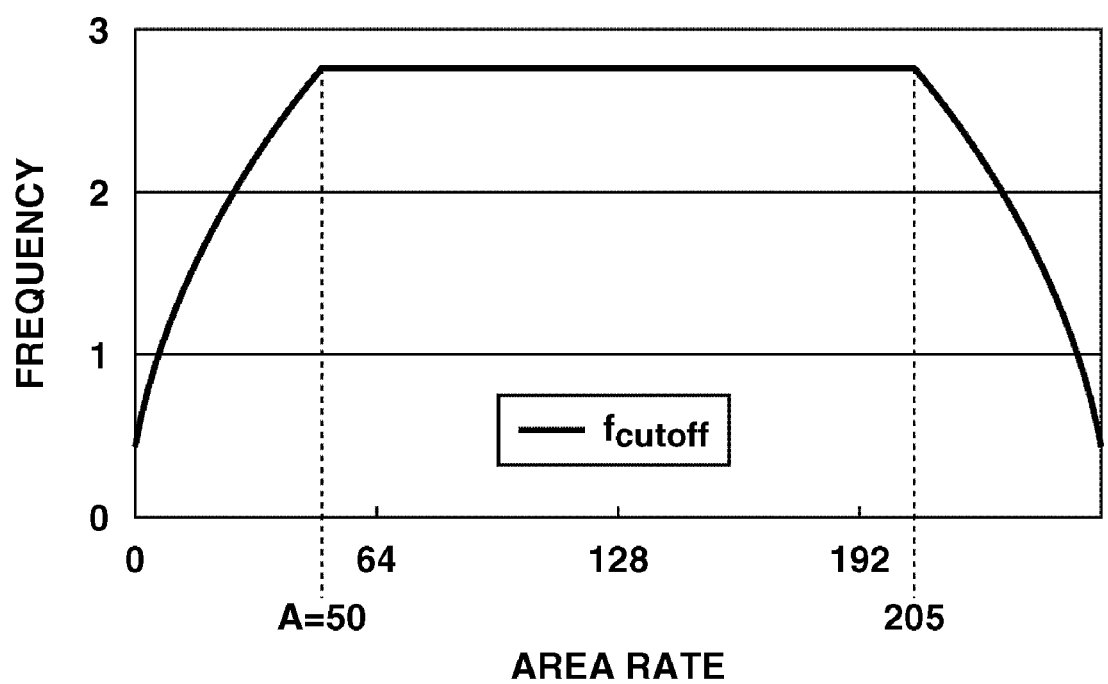
FIG. 33 illustrates a cutoff frequency f_cutoff_RG (I_RG).

In short, an exemplary embodiment designs an evaluation Gauss LPF: Gs_RG(f) and edits an RG color filter array so as to minimize a spectrum passing through Gs_RG(f). Then, the embodiment sets Gs_RG(f) based on the cutoff frequency f_cutoff_RG (I_RG). An exemplary embodiment uses the following formulas (124) through (126) to set the cutoff frequency f_cutoff_RG(I_RG). FIG. 33 illustrates the cutoff frequency f_cutoff_RG(I_RG) obtained when A=50 in formulas (124) through (126).

$$f\_cutoff\_RG(I\_G) = 2\pi \sqrt{\frac{I\_RG}{255}} \quad (0 \le k \le A) \quad (124)$$

$$f\_cutoff\_RG(I\_RG) = 2\pi \sqrt{\frac{A}{255}} \quad (A \le k \le 255 - A) \quad (125)$$

$$f\_cutoff\_RG(I\_RG) = 2\pi \sqrt{1 - \frac{I\_RG}{255}} \quad (255 - A \le k \le 255) \quad (126)$$

Increasing the value of A in the above-described formulas realizes a color filter array having dispersion in the intermediate gradation and increases the resolution of the color filter array. Decreasing the value of A realizes a centralized-type color filter array and increases the gradation of the color filter array. Therefore, an exemplary embodiment determines A to determine the cutoff frequency f_cutoff_RG(I_RG) of the evaluation Gauss LPF: Gs_RG(f). Namely, an exemplary embodiment gives A to obtain the cutoff frequency f_cutoff_RG(I_RG). In short, an exemplary embodiment gives "a" and "A" as parameters for determining the evaluation Gauss LPF.

In step S704, the control unit (editing unit 1205) edits the RG color filter array so as to minimize an evaluation value in the frequency characteristics of the RG color filter array. According to an exemplary embodiment, the control unit uses the genetic algorithm as described above. However, in another exemplary embodiment, the control unit can use another method. The following description includes expressions according to the genetic algorithm, which are well known and not described below in detail.

Figure 27:
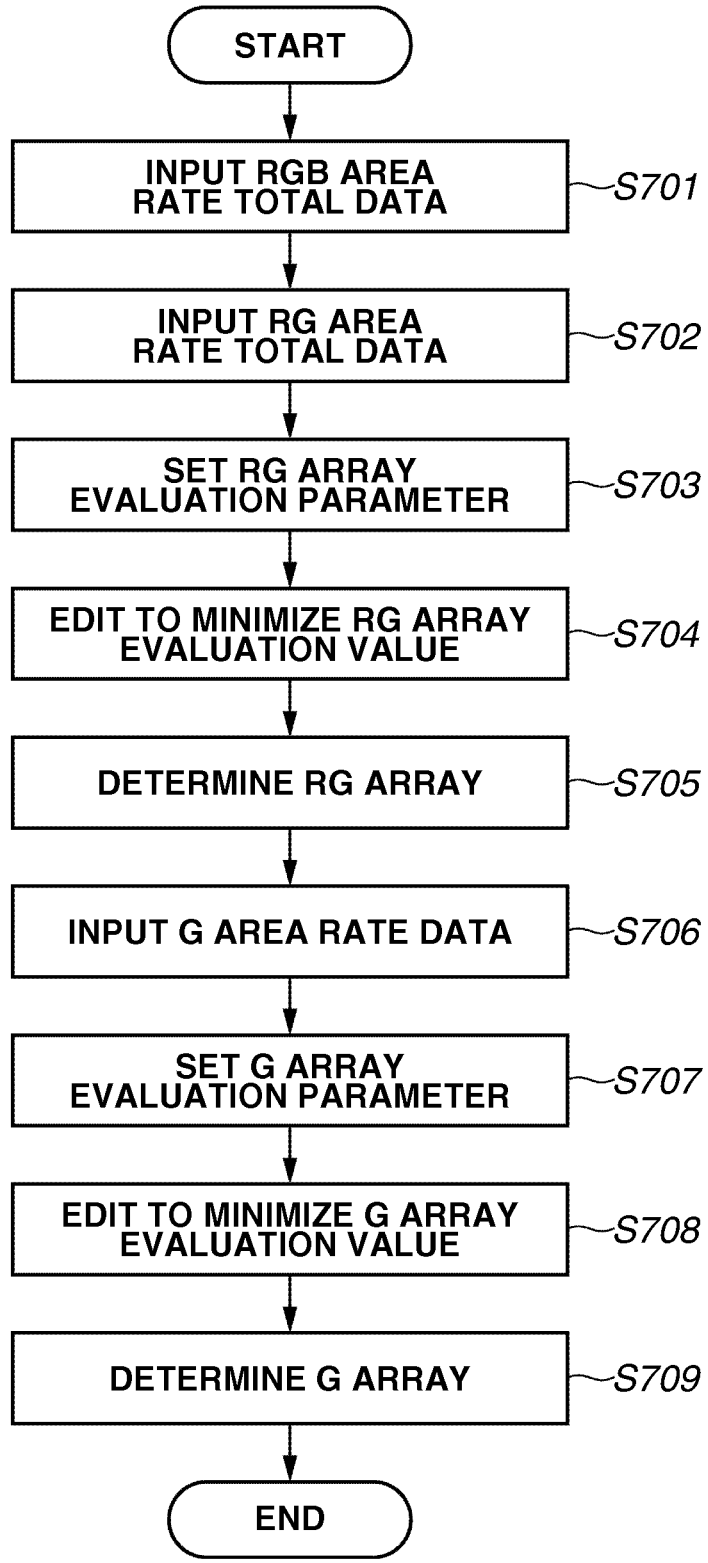
FIG. 27 is a flowchart illustrating example color filter array processing according to a sixth exemplary embodiment of the present invention.
Figure 28:
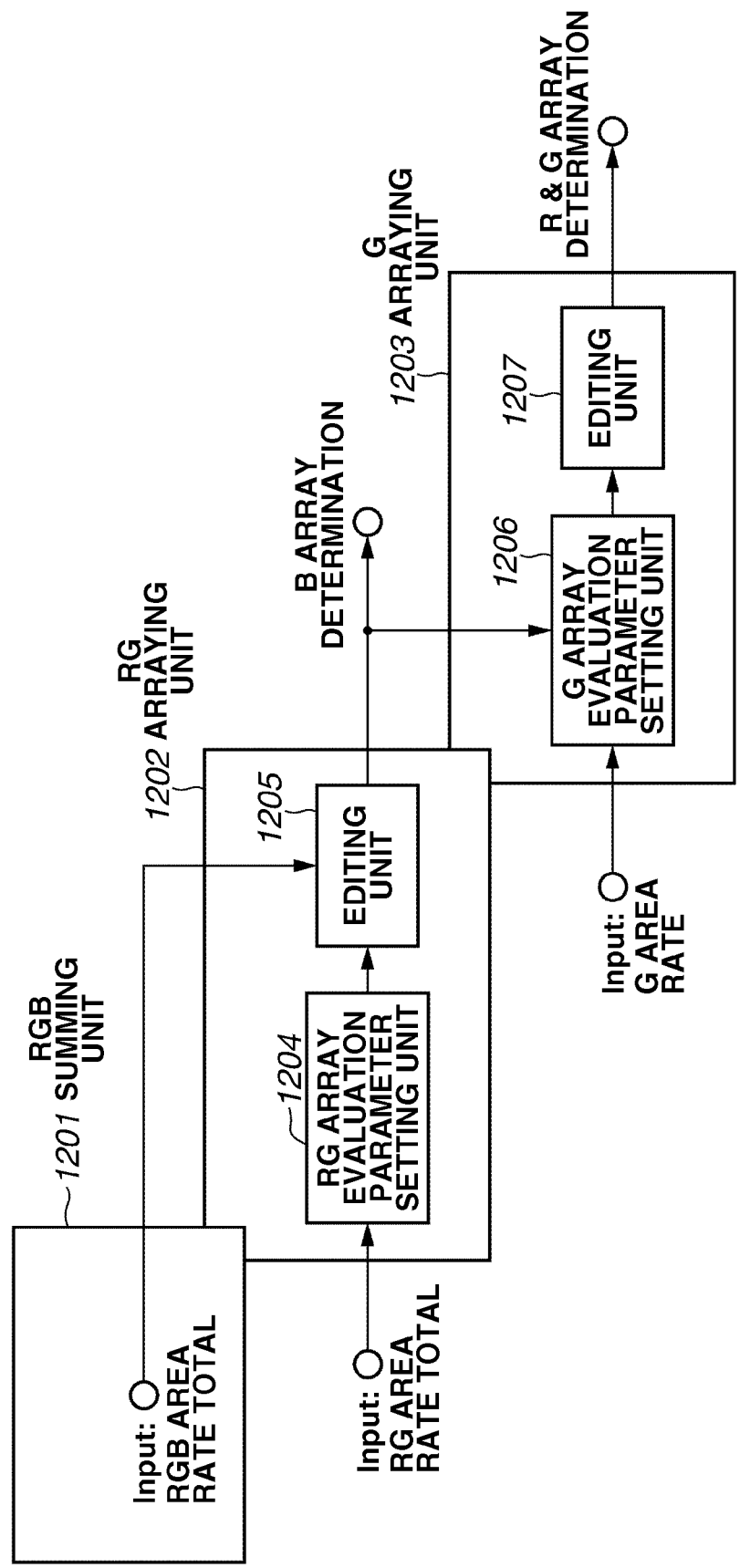
FIG. 28 is a block diagram illustrating an example circuit configured to determine a color filter array according to the sixth exemplary embodiment.
Figure 34:
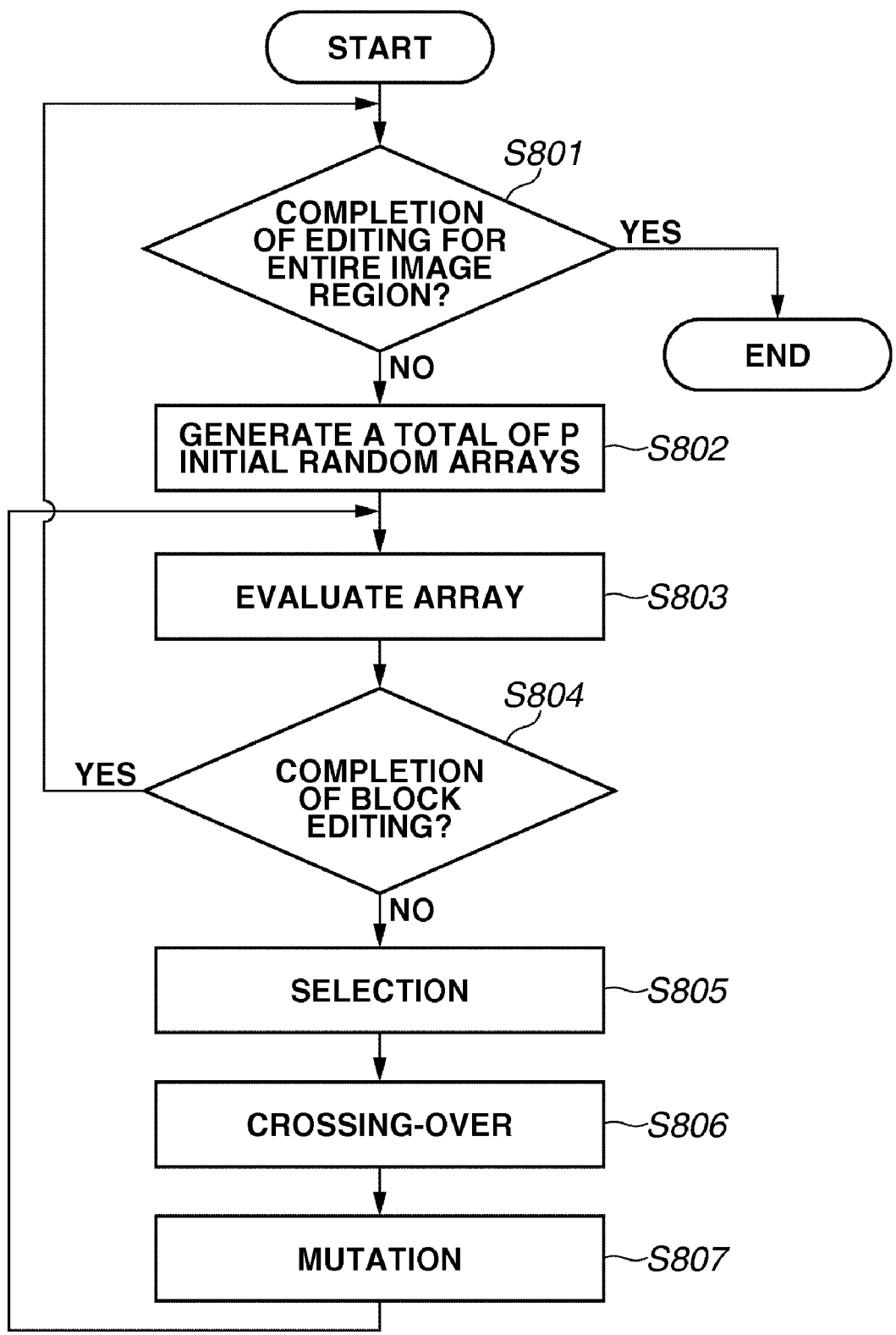
FIG. 34 is a flowchart illustrating detailed processing performed in step S704 illustrated in FIG. 27.

FIG. 34 is a flowchart illustrating detailed processing performed in step S704 illustrated in FIG. 27. An image is divided into small blocks and editing processing is applied to each small block. This is useful because it takes a long time to converge if the editing size is large. A preferred block size to quickly accomplish the convergence is in a range from 8×8 to 64×64.

Figure 35:
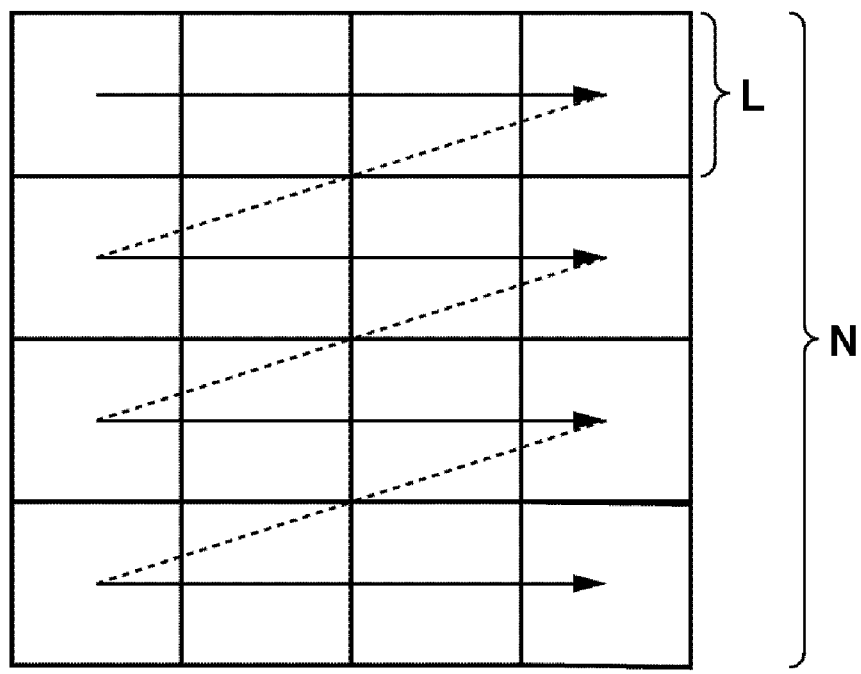
FIG. 35 illustrates an example editing order.

FIG. 35 illustrates example processing performed with a block size of L×L (L is a power of 2) for an image to be edited having an overall size of N×N (N is an integer multiple of L). According to an exemplary embodiment, the control unit successively edits the blocks of the image from the upper left position as illustrated in FIG. 35. According to another exemplary embodiment, the control unit can perform the editing operation according to another order.

In step S801, the control unit determines whether editing for the entire image region (N×N size) has been completed. If the editing for the entire image region (N×N size) has been completed (YES in step S801), the control unit terminates the processing of this routine. If the editing for the entire image region (N×N size) has not been completed yet (NO in step S801), the processing proceeds to step S802.

Figure 36:
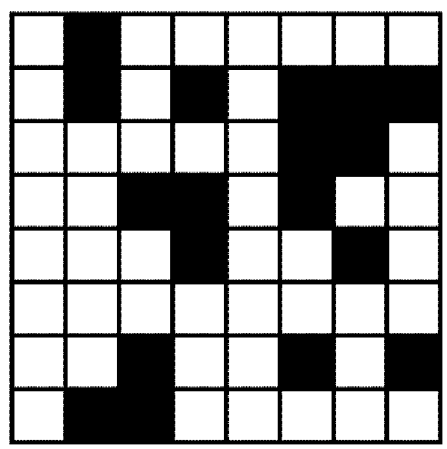
FIG. 36 illustrates an example initial random image composed of 8×8 blocks.

In step S802, the control unit generates an initial random array composed of a total of P blocks having a size of L×L. The processing in step S802 is equivalent to generating a total of P initial groups according to the genetic algorithm. The group is an individual (=chromosome) assembly. FIG. 36 illustrates an example initial random image having a size of 8×8, in which a white (array ON) block corresponds to gene: 1 and a black (array OFF) block corresponds to gene: 0.

According to another exemplary embodiment, the control unit can generate an image without considering a white/black array ratio or can set restrictive conditions reflecting the area rate. For example, if generation of a color filter array corresponding to an area rate 64 is required, the control unit can set the ON/OFF ratio to ON:OFF=1:3. This is useful to optimize the convergence speed. However, if the array ratio is not considered in the generation, the search can be performed in a wider range.

Figure 37:
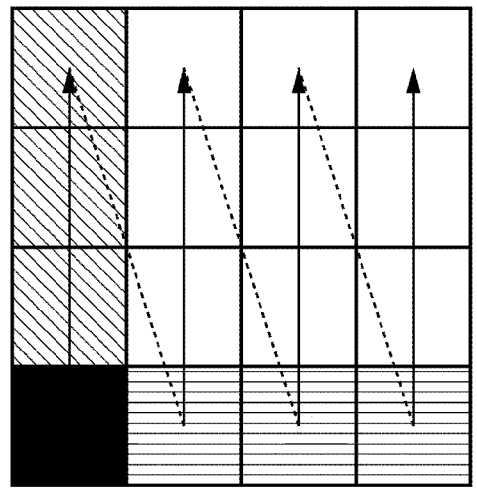
FIG. 37 illustrates example reference blocks.

In step S803, the control unit evaluates a total of P arrays using Gauss LPF:Gs_RG(f) from "a,A", which is set based on the parameters "a" and "A" by the RG array evaluation parameter setting unit 1204. In the evaluation, the control unit uses an evaluation method varying depending on the position of a block to be edited. In an exemplary embodiment, the control unit successively edits each block from an upper left position of the array illustrated in FIG. 35. As illustrated in FIG. 37, the control unit changes a reference block depending on the position of a block to be edited. The reference block is a "block having been already edited", which is referred to such that there is no discontinuity between the reference block and a "presently edited block (editing block)."

For example, when the control unit edits a black block in FIG. 37, there is not any block that has been already edited. Therefore, the control unit evaluates the editing block only. When the control unit edits an oblique-hatched block in FIG. 37, the control unit designates a left-hand block as a reference block because the left-hand block has been already edited. The control unit evaluates blocks corresponding to the size of H=2 L and V=L.

When the control unit edits a vertical-hatched block in FIG. 37, the control unit designates an upper block as a reference block because the upper block has been already edited. The control unit evaluates blocks corresponding to the size of H=L and V=2 L. When the control unit edits a white block in FIG. 37, the control unit designates three (left, upper left, and upper) blocks as reference blocks because the left, upper left, and upper blocks have been already edited. The control unit evaluates blocks corresponding to the size of H=2 L and V=2 L. In this case, the control unit does not change the array of the reference block(s) in the editing operation because the array of the reference block(s) has been already determined.

The following formula (127) represents an evaluation function J_RG that can be used in evaluation. In formula (127), N_RG represents the noise of an RG color filter array and D_RG represents the conservation of an array number relative to the area rate I_RG. The following evaluation function is a mere example and can be replaced with any other evaluation function.

$$J\_RG = wn \times N\_RG + wd \times D\_RG \quad (127)$$

In formula (127), wn and wd are weighting values.

$$N\_RG = \sqrt{\sum_{u=0}^{H-1}\sum_{v=0}^{V-1} |B\_RG(u,v)Gs\_RG(u,v)|^2} \quad (128)$$

$$B\_RG(u,v) = \sum_{x=0}^{H-1}\sum_{y=0}^{V-1} be(x,y) W_H^{xu} W_V^{vy} \quad (129)$$

$$\left(W_H = e^{-j\frac{2\pi}{H}}, W_V = e^{-j\frac{2\pi}{V}}\right)$$

$$Gs\_RG(u,v) = Gs\_RG(f) \quad (130)$$

$$f = \sqrt{u^2 + v^2},$$

and be (x, y) represents an evaluated array (0,1) currently being edited ($0 \leq x \leq H-1$, $0 \leq y \leq V-1$).

$$D\_RG = \left| I\_RG - \frac{1}{HV}\sum_{x=0}^{H-1}\sum_{y=0}^{V-1} 255 \cdot be(x,y) \right| \quad (131)$$

The genetic algorithm is used to search for an individual whose fitness is large. Therefore, if the image quality evaluation value is small, it is desirable that the fitness is large. Therefore, the following formula (132) can be used to define a fitness F.

$$F = (J\_RG\_max - J\_RG) + \alpha \quad (132)$$

In formula (132), α is a positive constant and J_RG_max represents a maximum evaluation value in the group of its generation (value of an individual having the worst evaluation value). The conversion of the evaluation function J_RG into the fitness F is not limited to the above-described formula. For example, a sigmoid function can obtain a fitness F that increases when the evaluation value J_RG decreases.

In step S804, the control unit determines whether the block editing has been completed. If the block editing has been completed (YES in step S804), the processing returns to step S801 to perform the above-described processing for the next target block. If the block editing has not been completed (NO in step S804), the processing proceeds to step S805.

In step S805, the control unit performs selection according to the genetic algorithm. The selection according to the genetic algorithm is processing for leaving an individual having a large fitness for the next generation. For example, the control unit sets a roulette rule so that the probability of selecting an individual increases when the fitness of this individual is large. Alternatively, the control unit can perform the selection according to a tournament method. Both the roulette rule and the tournament method are well-known processing for the genetic algorithm.

In step S806, the control unit causes the individuals selected in step S805 to cross over according to a crossing-over probability pc ($0 \leq pc \leq 1$). The crossing-over, as illustrated in FIG. 38, includes a vertical crossing-over and a horizontal crossing-over. The crossing-over position and a selection between the vertical crossing-over and the horizontal crossing-over can be switched at random.

In step S807, the control unit causes the individual to mutate with a mutation probability pm ($0 \leq pm \leq 1$). The mutation, as illustrated in FIG. 39, turns white (array ON) into black (array OFF) or turns black (array OFF) into white (array ON). The mutation position can be determined at random. When the control unit completes the mutation, the processing returns to step S803.

Through the above-described processing, the control unit can complete the editing for minimizing the RG array evaluation value in step S704. At the same time, the control unit can determine an array result Out_RG (quantized value 0 or 1) of the RG area rate total data.

In step S705, the control unit obtains the array result Out_RG (quantized value 0 or 1) of the RG area rate total data calculated in step S704. At the same time, the control unit calculates a final output value Out_B of the B area rate data according to the following formulas.

If Out_RG=0, (133)

Out_B=1 (134)

If Out_RG=1, (135)

Out_B=0 (136)

The meaning of determining the array of RG area rate total data is described below. If the relationship Out_RG=1 is satisfied, either the R filter or the G filter is arranged on this position. Namely, the relationship Out_RG=1 indicates that the filter layout for the R and G filters is not yet fixed. However, the determination finalized at this moment is that at least one of the R filter and the G filter is arranged on this position.

The foregoing description can be summarized in the following manner.

Out_RG=0 indicates that neither of the R and G filters is arranged. Namely, the arrangement of the B filter is fixed.
Out_RG=1 indicates that either the R filter or the G filter is arranged.

Next, the control unit determines an array for G area rate data I_G. First, in step S706, the control unit inputs the G area rate data I_G into a G arraying unit 1203. In step S707, the control unit (G array evaluation parameter setting unit 1206) sets an evaluation parameter in the same manner as the processing in step S703.

In step S708, the control unit (editing unit 1207) edits the color filter array so as to minimize an evaluation value in the frequency characteristics of the G color filter array. According to an exemplary embodiment, the control unit uses the genetic algorithm as described above. However, in another exemplary embodiment, the control unit can use another method. The processing performed in step S708 is similar to the processing performed in step S704 although I_RG is replaced with I_G.

In the quantization of G data, the control unit takes the following conditions into consideration.
1. A portion where the array of G data becomes Out_G=1 is limited to a portion where the array of RG total data becomes Out_RG=1.
2. A portion where the array of G data becomes Out_G=0 is limited to a portion where the array of RG total data becomes Out_RG=0.

When the array Out_G of G data is determined, a quantized value Out_R of R data can be obtained according to the following formula (109).

$$Out\_R = Out\_RG - Out\_G \quad (109)$$

Through the above-described processing, the control unit finalizes the array (quantized value 0 or 1) of the G area rate data I_G (step S709). At the same time, the control unit finalizes an array result (quantized value 0 or 1) of R area rate data I_R.

The above-described determination of the G filter array is a G-oriented array determination. Namely, an exemplary embodiment can determine the G filter array so that low-frequency components can be greatly reduced. Upon determining the layout of the G filter, an array result of the R filter is fixed. However, as the R filter array has also been subjected to the editing according to the genetic algorithm, the R filter array can have characteristics having a reduced amount of component in a low-frequency region and a band component in a high-frequency region.

As described above, an exemplary embodiment minimizes an evaluation function so as to have a reduced amount of component in a low-frequency region and a band component in a high-frequency region and obtains a desired color filter array. An exemplary embodiment can realize other multi-color filter arrays in addition to the above-described example RGB 3-color filter array.

Similar to the third exemplary embodiment, the determination order of the RGB color filters according to an exemplary embodiment is "RG array→ remainder=B→determination of G→remainder=R." According to another exemplary embodiment, the determination order can be "G array →R array→B array" as described the in fourth and fifth exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2007-123374 filed May 8, 2007 and No. 2008-091560 filed Mar. 31, 2008, which are hereby incorporated by reference herein in their entirety.

What is claimed is:

1. An image sensor comprising:
    a photoelectric conversion element group having a plurality of photoelectric conversion elements; and
    color filters of at least two colors arranged on respective photoelectric conversion elements of the photoelectric conversion element group,
    wherein the color filters are arranged on the respective photoelectric conversion elements such that a spatial frequency component of array of color filters of each color includes a reduced amount of component in a low-frequency region and a band component in a high-frequency region.

2. The image sensor according to claim 1, wherein the array of color filters of each color includes an array obtained according to an error diffusion method.

3. A color imaging apparatus comprising:
    a color image sensor including a photoelectric conversion element group and color filters of at least two colors arranged on the photoelectric conversion element group; and
    an interpolation processing unit configured to perform interpolation processing on color signals output from the color image sensor to generate image signals corresponding to a plurality of color components,
    wherein the color filters are arranged on the photoelectric conversion element group such that a spatial frequency component of array of color filters of each color includes a reduced amount of component in a low-frequency region and a band component in a high-frequency region.

4. The color imaging apparatus according to claim 3, wherein the array of color filters of each color includes an array obtained according to a method for editing the array to reduce a low-frequency component.

5. The color imaging apparatus according to claim 3, wherein the interpolation processing unit performs the interpolation processing using an interpolation parameter that is set to remove a band component in a high-frequency region of the array of color filters of each color.

6. The color imaging apparatus according to claim 5, wherein the interpolation parameter includes a digital filter.

7. The color imaging apparatus according to claim 5, wherein the interpolation parameter includes an interpolation function.

8. The color imaging apparatus according to claim 5, wherein the interpolation parameter varies depending on an array distribution of peripheral color filters.

* * * * *